(12) United States Patent
Elkins, II et al.

(10) Patent No.: US 7,720,708 B1
(45) Date of Patent: May 18, 2010

(54) SYSTEM AND METHOD FOR SELLING PERISHABLE PRODUCTS

(75) Inventors: Harold Edward Elkins, II, Highland Park, TX (US); Robert Jelks Ward, Irving, TX (US); Paula F. Calise, Dallas, TX (US)

(73) Assignee: Launch Ramp LLC, Dallas, TX (US)

( * ) Notice: Subject to any disclaimer, the term of this patent is extended or adjusted under 35 U.S.C. 154(b) by 731 days.

(21) Appl. No.: 11/711,584

(22) Filed: Feb. 26, 2007

Related U.S. Application Data

(60) Provisional application No. 60/776,395, filed on Feb. 24, 2006.

(51) Int. Cl.
*G06Q 30/00* (2006.01)
(52) U.S. Cl. ............... 705/14.23; 705/14.1; 705/26
(58) Field of Classification Search ............... None
See application file for complete search history.

(56) References Cited

U.S. PATENT DOCUMENTS 6,269,343 B1 * 7/2001 Pallakoff ............... 705/26
2002/0032597 A1 * 3/2002 Chanos ............... 705/10
2002/0052778 A1 * 5/2002 Murphy et al. ............... 705/14
2002/0069118 A1 * 6/2002 Zylstra ............... 705/26
2002/0116264 A1 * 8/2002 Feidelson et al. ............... 705/14
2006/0242029 A1 * 10/2006 Walker et al. ............... 705/26
2007/0016472 A1 * 1/2007 Reznik ............... 705/14
2007/0278288 A1 * 12/2007 Simmons ............... 235/380

* cited by examiner

*Primary Examiner*—F. Ryan Zeender
*Assistant Examiner*—Faris Almatrahi

(57) ABSTRACT

An exemplary system and method are provided to sell a plurality of limited perishable products. The method may include offering to sell the first perishable product at first defined conditions that include an initial price and a minimum refund schedule; or an initial price, an incentive relative to another offer to sell the product, and a purchaser agreement to receive a directed offer. The method may include receiving an acceptance from a first purchaser; and making the first perishable product again available for sale if a first refund opportunity is exercised by purchaser. The method may include determining and offering a directed offer related to the first perishable product that may include a hold incentive or a release incentive option. The method may continue for additional products of the limited perishable products that are of the same (or similar) type and each having the same (or similar) expiration date.

46 Claims, 14 Drawing Sheets

Figure 5

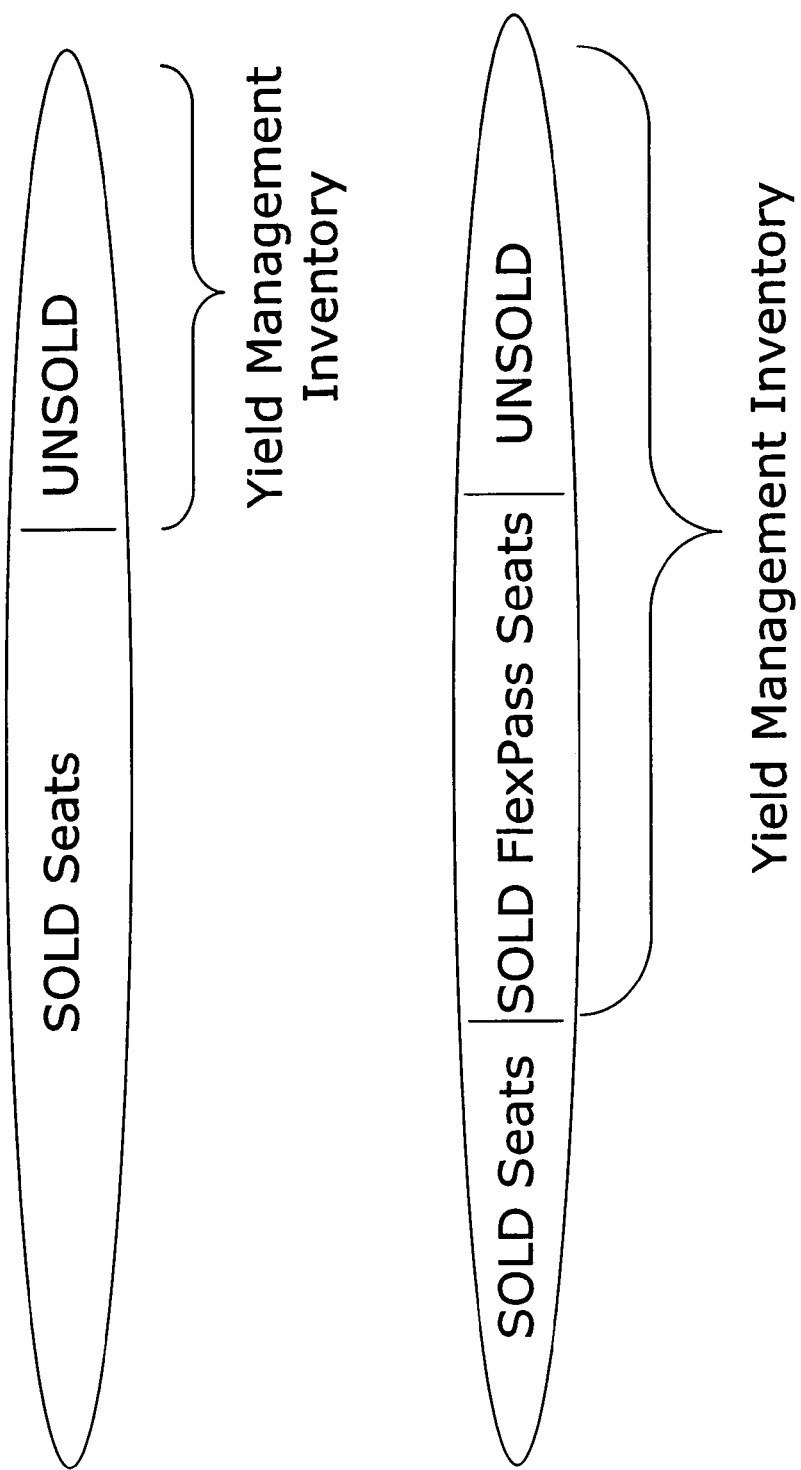

Figure 13

Flex Pass Yield Management Simulator

Without FlexPass (1302)

| Flight Averages | | |
|---|---|---|
| Seats Sold (Net) | | 117 |
| Ticket Revenue (Net) | $ | 24,241 |
| Change Fees / Impact | $ | 396 |
| Variable Costs | $ | (1,997) |
| Contribution Margin | $ | 22,641 |

With FlexPass (1304)

| Flight Averages | | |
|---|---|---|
| Seats Sold (Net) | | 119.2 |
| Ticket Revenue (Net) | $ | 28,051 |
| Change Fees / Impact | $ | (157) |
| Variable Costs | $ | (2,368) |
| Contribution Margin | $ | 25,526 |
| FlexPass Advantage | $ | 2,885 | 12.7% |

Run Simulation (1308)
(Max. 2000)
Iterations to Run: 2000
Iterations Complete: 2000

Other Details (1310)

| | Quantity | Revenue | Contribution |
|---|---|---|---|
| Regular Sales | 56.0 | $ 9,862 | $ 8,910 |
| FP Sales | 62.8 | $ 15,167 | $ 14,099 |
| Total Initial Sales | 118.8 | $ 25,029 | $ 23,009 |
| Refunds | 11.4 | $ (1,601) | $ (1,608) |
| Re-Sales | 9.4 | $ 2,396 | $ 3,236 |
| Net Resales | | $ 1,595 | $ 1,628 |
| Additional Low Demand Sales | 2.3 | $ 381 | $ 342 |
| Net Seats Sold | 119.2 | | |
| Higher fares on Low Demand Flights | 2.3 | $ 152 | $ 152 |
| Higher fares on High Demand Flights | 3.4 | $ 894 | $ 894 |
| Customer Service Costs | 42.7 | | $ (341) |
| Change Fees | 5.5 | $ 274 | $ 274 |
| Other Lost Change Fees Impact | 5.5 | $ (476) | $ (432) |
| | | | $ 27,154 |

Per Transaction Average CM (1306)

| | Without Incentive | With Release Incentive | Earlier | Same Date | Later |
|---|---|---|---|---|---|
| | $ (140) | | | | $ (149) |
| | $ 181 | | | | $ 33 |
| | $ 332 | | | | $ 253 |
| | | $ 149 | | | |
| | | $ 66 | $ 74 | | |
| | | $ 265 | $ 293 | | |

SYSTEM AND METHOD FOR SELLING PERISHABLE PRODUCTS

CROSS-REFERENCE TO RELATED APPLICATIONS

Pursuant to 35 U.S.C. §119(e), this application claims priority from, and hereby incorporates by reference for all purposes, U.S. Provisional Patent Application Ser. No. 60/776,395, entitled System and Method For Selling Perishable Products, naming Harold Edward Elkins, II, Robert Jelks Ward, and Paula F. Calise as inventors, and filed Feb. 24, 2006.

TECHNICAL FIELD OF THE INVENTION

The present invention relates generally to systems and methods for the sale of products and services and more particularly, but not by way of limitation, to a system and method, such as a computer or network implemented system and method, for selling perishable products, including a plurality of limited perishable products of the same or similar type that may have the same or a similar expiration date.

BACKGROUND OF THE INVENTION

Many products and services are subject to significant price volatility based on the laws of supply and demand. This is particularly true of perishable products and services (hereinafter collectively "products") that have a significant capacity value that becomes worthless once the capacity, or event, has expired. For example, an empty airline seat has no value once the plane has departed, and a concert event seat is worthless once the concert is over. These all represent limited perishable products (the number of seats) with a common expiration date (the event or flight date). So it goes for other products such as theatre tickets, sporting events, hotel nights, and cruise staterooms. Consumers have limited options today when faced with the decision to purchase these products, and sellers often are not able to optimize or properly manage their revenues when selling such products.

Using the airline example, consumers typically must choose between expensive refundable fares including first class, business class, and full coach fares; or deeply discounted, non-refundable fares. Often, consumers feel pressured to purchase tickets well in advance of their flight in order to obtain pricing that fits within their budget, even though they may have considerable uncertainty regarding their plans. With deeply discounted fares, most airlines charge a significant transfer or change fee to make schedule changes, and often offer limited or no refund options on such fares. This situation presents problems for both consumers and airlines, and often results in consumers deciding not to purchase tickets at all and/or suffering the risk and uncertainty of fare increases or fare volatility as the time for the flight approaches. Airlines, similarly, do not sell as many tickets as reluctant consumers choose not purchase tickets under such terms, and airlines lose the opportunity to fully optimize and manage revenue yields.

Furthermore, there presently exists no meaningful market for airlines to facilitate the transfer of (or to create a market for) previously sold seats from existing ticket purchasers that do not place as high a value on tickets as later potential purchasers do based on changing or increased later demands. This situation results in a loss of significant potential revenue and reduced revenue yields that otherwise could increase an airline's profitability. Ticket agents and/or ticket brokers and market makers also suffer from these same problems and disadvantages.

Similar problems and disadvantages exist in connection with the auctioning of the same or similar items, products or services. For example, the sales of products on the Internet through an Internet auction site often present consumers with the difficult choice of immediately buying an item outright, which may result in paying too high a price, or waiting for the auction to take place resulting in not winning the auction and having to wait to get the product, possibly losing the opportunity to purchase the product altogether, or possibly paying a much higher price. Auction sellers that sell the same or similar items have the problematic choice of running numerous simultaneous auctions expiring at or near the same time resulting in a possible oversupply and lower bid amounts, or running fewer auctions and running the risk of losing sales to others and resulting in increased overall inventory costs.

SUMMARY OF THE INVENTION

From the foregoing it may be appreciated that a need has arisen for a system and method for selling perishable products that may provide enhanced refund and exchange options to both sellers and consumers, and that may provide reselling options for a previously sold product, such as a perishable product or service (hereinafter collectively "product") with the same or similar expiration date. In accordance with the present invention, a system and method for selling perishable products are provided that substantially eliminate one or more of the disadvantages and problems outlined above.

According to an aspect of the present invention, a method, and a system for carrying out the method such as a computer or network implemented system, is provided for a seller to sell a plurality of limited perishable products, where each one of the plurality of limited perishable products are of the same (or similar) type and each one having the same or similar expiration date, is provided. The method may include determining an initial price at a first time to sell a first perishable product of the plurality of limited perishable products; determining a minimum refund schedule for the first perishable product that includes at least a first refund opportunity with a first minimum refund amount that may be elected by a purchaser during a first refund time period for the first perishable product; and offering to sell the first perishable product at first defined conditions that include at least the initial price and the minimum refund schedule.

The method may include receiving an acceptance from a first purchaser of the offer to sell the first perishable product at the first defined conditions; and making the first perishable product again available for sale if the first refund opportunity with the first minimum refund amount is elected during the first refund time period for the first perishable product.

The method may include determining a demand for one of the plurality of limited perishable products at a time after the acceptance of the offer to sell the first perishable product at the first defined conditions; determining a directed offer related to the first perishable product that is based at least in part upon the determined demand for one of the plurality of limited perishable products at the time after the acceptance of the offer to sell the first perishable product, and wherein the directed offer may include either a hold incentive option or a release incentive option. In other embodiments, the directed offer may not include any change in the original offer, and thus the demand may not justify or require either a hold incentive option or a release incentive option. The method may then include offering the directed offer related to the first perishable product to the first purchaser, and the directed offer may be elected by the first purchaser.

Further, the method may include buying back the first perishable product from the first purchaser if the directed offer related to the first perishable product includes the release incentive option and it is accepted.

The method may continue as just described for one or more of the plurality of limited perishable products that are of the same (or similar) type and each one having the same or similar expiration date. For example, the method may include determining an initial price at a second time, which may be different from the first time, to sell a second perishable product from the plurality of perishable products; determining a minimum refund schedule for the second perishable product that includes at least a first refund opportunity with a first minimum refund amount that may be elected by a purchaser during a first refund time period for the second perishable product; and offering to sell the second perishable product at second defined conditions that include at least the initial price and the minimum refund schedule for the second perishable product.

The method may then include receiving an acceptance from a second purchaser of the offer to sell the second perishable product at the second defined conditions; and making the second perishable product again available for sale if the first refund opportunity with the first minimum refund amount is elected during the first refund time period for the second perishable product.

The method may further include determining a demand for one of the plurality of limited perishable products at a time after the acceptance of the offer to sell the second perishable product at the second defined conditions; determining a directed offer related to the second perishable product that is based at least in part upon the determined demand for one of the plurality of limited perishable products at the time after the acceptance of the offer to sell the second perishable product, and wherein the directed offer may include either a hold incentive option or a release incentive option. In other embodiments, the directed offer may not include any change in the original offer, and thus the demand may not justify or require either a hold incentive option or a release incentive option. The method may then include offering the directed offer related to the second perishable product to the second purchaser, and the directed offer may be elected by the second purchaser.

Further, the method may include buying back the second perishable product from the second purchaser if the directed offer related to the second perishable product includes the release incentive option and it is accepted.

According to another aspect of the invention, a system for implementing the method may be provided that will, preferably, be implemented using a computer system or network, such as the Internet or some other widely accessible wired or wireless network, that includes a plurality of clients and servers. In one aspect, a web or GUI interface is provided that allows for a consumer to electronically purchase a perishable product, and to allow the user, if desired or if elected, to receive an electronic reminder of the one or more refund time periods or windows, which may also be referred to or understood to mean exchange time periods. Such a system allows users/consumers to easily and conveniently access an implementation of an aspect of the invention to purchase a perishable product, while allowing a seller to minimize its overhead and administrative costs associated with selling a plurality of perishable products or services while utilizing the significant economic advantages of one or more aspects of the invention.

As a further feature of the above aspect, the method may include reselling a perishable product that has been returned to the seller through a refund or exchange time period, or in response to a release incentive. The seller may then resell the perishable product at a possible higher selling price than the initial price originally paid for the perishable product. Yet further features may include a web portal to facilitate ease of use and/or administration of the system, using a user or purchaser profile to assist with more effectively designing release and hold incentives tailored to a particular purchaser's preferences or interests stored in a profile.

Another implementation of the invention includes presenting available products and prices, offering the option consisting of multiple exchange and/or refund options with guaranteed minimum refunds available in one or more time periods, consummating the purchase transaction, confirming the transaction and explaining the terms of the option, providing access to information on exchange options including other products and/or schedules; sending reminders to the customer (if desired) prior to refund window expirations, such reminders optionally containing hold incentives, release incentives, promotions, special offers, and ads with the capability to influence demand and transact additional business; optionally providing special offers for exchanges to other products and/or schedules, enhanced refund levels, and/or bonus offers with the capability to transact such offers; collecting data and building customer profiles to enable tailored offers; and the re-sale of previously sold products made available for re-sale as a result of the refund or exchange.

According to yet another aspect of the present invention, a method, and a system for carrying out the method such as a computer or network implemented system, is provided for a seller to sell a plurality of limited perishable products, where each one of the plurality of limited perishable products are of the same (or similar) type and each one having the same or similar expiration date, is provided. The method may include determining an initial price at a first time to sell a first perishable product of the plurality of limited perishable products; offering to sell the first perishable product at first defined conditions that include at least the initial price and a purchaser agreement to receive at least one directed offer related to the first perishable product via an authorized communications medium.

The method may next include receiving an acceptance from a first purchaser of the offer to sell the first perishable product at the first defined conditions; determining a demand for at least one of the plurality of limited perishable products at a time after the acceptance of the offer to sell the first perishable product at the first defined conditions; determining a directed offer related to the first perishable product that is based at least in part upon the determined demand for one of the plurality of limited perishable products at the time after the acceptance of the offer to sell the first perishable product, and the directed offer includes at least a hold incentive option or a release incentive option.

The method may further include offering the directed offer related to the first perishable product to the first purchaser via the authorized communications medium, and the directed offer may be accepted by the first purchaser; buying back the first perishable product from the first purchaser if the directed offer related to the first perishable product is accepted and includes the release incentive option.

The method may further include determining an initial price at a second time (which may be the same as or different from the first time described above) to sell a second perishable product of the plurality of limited perishable products; offering to sell the second perishable product at second defined conditions that include at least the initial price and a purchaser agreement to receive at least one directed offer related to the second perishable product via the authorized communications medium; and receiving an acceptance from a second purchaser of the offer to sell the second perishable product at the second defined conditions.

The method may then include determining a demand for at least one of the plurality of limited perishable products at a time after the acceptance of the offer to sell the second perishable product at the second defined conditions; determining a directed offer related to the second perishable product that is based at least in part upon the determined demand for one of the plurality of limited perishable products at the time after the acceptance of the offer to sell the second perishable product, wherein the directed offer includes at least a hold incentive option or a release incentive option; offering the directed offer related to the second perishable product to the second purchaser via the authorized communications medium; and buying back the second perishable product from the second purchaser if the directed offer related to the second perishable product is accepted and includes the release incentive option.

The various embodiments and implementations of the present invention may provide a profusion of potential technical advantages and benefits that may include one or more of the following. A technical advantage of the present invention may include the capability to provide a combination of options for purchasers to obtain partial refunds or exchanges when their plans change or for any other reason, this system and method creates liquidity and allows a previously sold product (or service, which is included in herein in the definition of product or item) to be re-sold. Furthermore, this system and method accomplishes this liquidity without requiring the customer or purchaser to agree to a buyout-provision or other type of provision that would obligate the original purchaser to surrender their product under certain conditions, and without conditioning the availability of the purchaser's options on the seller recalling the product or otherwise initiating a secondary transaction; but rather, makes these various options available to the purchaser for election at the purchaser's discretion, thus substantially increasing the purchaser's options. This represents a significant advancement over the current art for both sellers and purchasers.

Another technical advantage of the present invention may include the capability to increase overall realization and revenues by providing a powerful demand and yield management tool for sellers such as airlines, concert promoters, show promoters, products sold via an electronic auction, hotels, sports teams, etc.

Yet another technical advantage of the present invention may include the capability to increase overall sales, while providing consumer flexibility heretofore not available from other sellers. By easing the commitment to purchase because of the exchange and refund options available, sales and revenues increase. This also increases advance purchases.

Still yet another technical advantage of the present invention includes the capability to provide purchasers with a directed offer, which may include either a hold incentive option or a release incentive option (or both), so that sellers are provided additional control over their yield management and marketing by providing tailored or custom directed offers based on a customer's particular profile. This benefits both consumers and sellers by providing a system where maximum value can be provided to both sides of a transaction by providing a personalized profile of a user or consumer to determine what that consumer prefers and hence would constitute value for that consumer. For example, a directed offer related to golf is of more value to a consumer that enjoys golf, as determined from a prior personalized profile.

Technical advantages in certain implementations and instances can be significant. For example, advantages from an airlines implementation may include some of the following: provides robust demand management tool for both high demand and low demand flights; creates liquidity in previously sold seats; creates competitive advantage over airlines without the program; can provide reminders and offers that are designed to influence demand in either direction depending on relative demand for flight; encourages advance purchases; and provides two-way marketing channel through e-mail/web reminders, promotions, offers, and advertisements, which strengthens customer relationships. Advantages from a customers standpoint may include one or more of the following: increases available ticketing options; allows customer to lock-in best fare with exchange and partial refund options; may, in some implementations, guarantee generous refund during initial window, creating a virtual extended hold for a modest premium; may provide exchange options to select flights and destinations; no additional cost or loss of rights to seat (no special recall provision is necessarily granted to the airline); potential to realize refund exceeding guaranteed level or with bonus miles (at airline's option); and may provide additional valuable offers including sales on alternative flight times, other destinations, or other travel-related services.

Other technical advantages and benefits may be readily apparent to one skilled in the art from the following detailed description of the invention when read in conjunction with the accompanying figures, description, appendix and aspects of the invention.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like or similar parts or aspects, in which:

FIG. 5 is a graphical user interface illustrating an implementation of the system and method offering to sell airline tickets using an implementation of the present invention, and as marketed under the FLEXPASS brand;

FIG. 12 is an illustrated diagram demonstrating how the present invention may provide additional yield management capabilities;

FIG. 13 is an illustrated tabular display or "visualizer" illustrating summary results of a yield management simulator based upon a model of an implementation of one embodiment of the present invention to demonstrate a potential financial impact over numerous airline flights for an implementing airline or airline ticket seller.

DETAILED DESCRIPTION OF THE INVENTION

Figure 1:
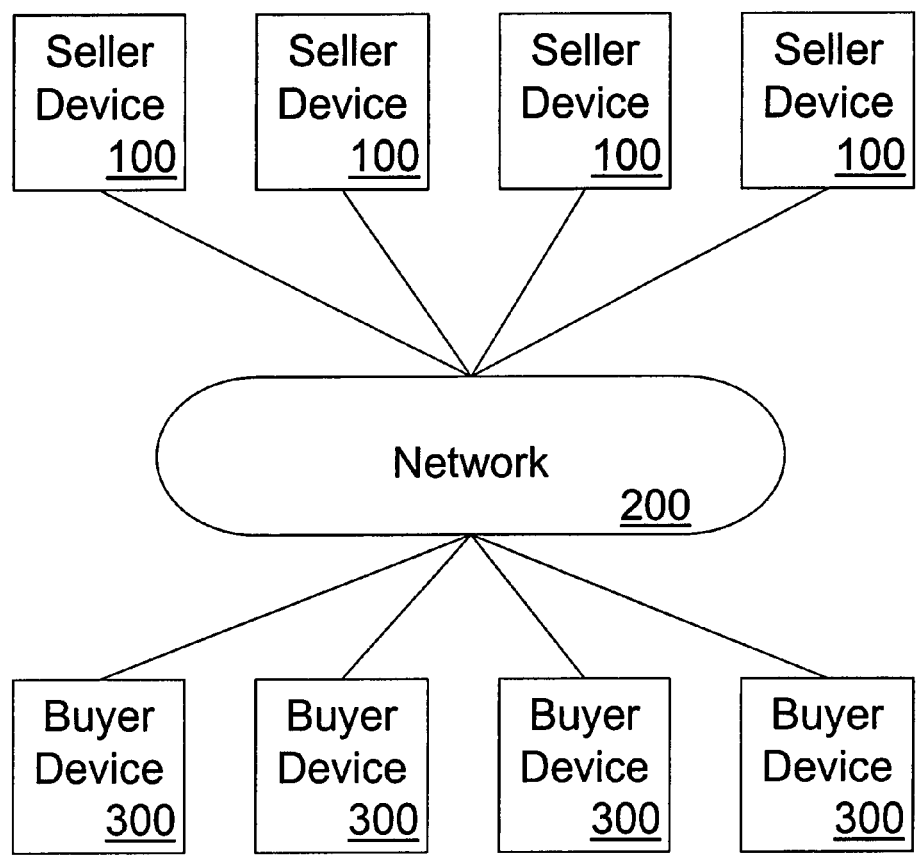
FIG. 1 is a block diagram of a system for a seller to sell a plurality of limited perishable products available for sale, each one of the plurality of limited perishable products of the same (or similar) type and each one having the same (or similar) expiration date according to an embodiment of the present invention.

It should be understood at the outset that although an exemplary implementation of the present invention is illustrated below, the present invention may be implemented using any number of techniques, computer and communications systems, whether currently known or in existence. The present invention should in no way be limited to the exemplary implementations, drawings, and techniques illustrated below, including the exemplary design and implementations illustrated and described herein. Additionally, the drawings contained herein are not necessarily drawn to scale.

Before each individual FIGURE is discussed, several aspects of the invention are discussed below. A method for a seller to sell perishable products such as, for example, airline tickets, concert tickets, Broadway play tickets, sporting event tickets, hotel rooms, auctioned items and other products (or services) whose value diminishes significantly at some future time, which may be referred to as an expiration time. It should be understood that the term "product" or "products," as used herein, should be understood to also include "service" or "services," respectively. It should also be understood that an expiration time may be an exact time, or may include a range of times, depending on the perishable product, and how it is defined and used.

A perishable product may be defined herein as a product or service, such as, for example, a ticket to an event, that must be used on or before a certain date, or range of dates. For example, a concert ticket, a sporting event ticket, an airline ticket, food with an expiration date, and a prescription drug, are all examples of what may be defined as a perishable product. Another example of a perishable product may include an option contract, such as an option to buy real estate, time-share real estate interest, fractional interest ownership interest in an airplane, investment securities, such as stock, and personal property. The option will expire at a period in the future, and thus may be described and defined as a perishable product.

The expiration date for a plurality of perishable products may be the identical expiration date or the same or similar expiration date. For example, two concerts by an artist over a weekend or close period of time may be thought of as having the same or similar expiration times. Similarly, a reservation for a CT or MRI scan, or a massage may have multiple times throughout a day or period in which the event will occur. Any of these times during a day, or even over several days, may be thought of as having the same or similar expiration date. An online auction of the same or similar products with expiration dates that are the same day or around the same time may also constitute a plurality of products with an expiration date, even though such expiration dates are not exactly the same, but they can be considered similar.

Another example of a perishable product may include a bid to buy an item at a specified price that will otherwise be subject to a future auction. For example, the EBAY auction service that is available through the Internet, allows users or bidders in some auctions to forego the auction or to stop the auction by agreeing to buy the product (which also includes services) at a specified price. This has been marketed by the EBAY service as the BUY IT NOW feature. The present invention includes, as one of its aspects, an enhancement of the capability to stop an auction (or for an auction to take place in the future) for a product or service by allowing a purchaser to agree to buy the product at agreed upon terms that include one or more refund periods with guaranteed minimum refund amounts. If the purchaser exercises an option to obtain a refund, the product may again be auctioned. This refund feature would greatly increase the participation in BUY IT NOW options in online auctions—increasing revenue for the seller, and the auction company or bailee, market maker or auction agent.

As mentioned above, it should be understood that the expiration date for a plurality of perishable products, such as a plurality of auctions selling the same or similar products, may be an identical expiration time, date or the same or similar expiration date.

It should be understood that the term "same" as used herein should be interpreted broadly to include "similar." For example, different seats on the same plane may not be identical, but would be considered to be the same or similar product, and, thus may generally be referred to and defined herein as being the same. Another example may include a seat on a first airplane and a seat on a second airplane where the airplanes embark from a departure airport around the same time, and arrive at a destination airport around the same time. These may be considered the "same" seat or perishable product in this application. Another example would be a ticket to an entertainment act, such as a concert, being performed at a venue on consecutive three day performances, such as a Friday, Saturday and Sunday. The "same" perishable product, according to this application, may include tickets to any of the three performances occurring at the same location or venue at a time in close proximity, or it could include tickets to the same show on the same night.

In one preferred implementation, the seller may first determine or set an initial price to sell a perishable product and determine or set a minimum refund schedule that includes one or more refund opportunities with minimum refund amounts that may be elected by the purchaser during the refund periods. It should be understood that the term seller as used herein may include the owner of a product or service, an agent of the owner of a product, a bailee of a product, a party with a right to sell a product, and/or a party in possession of a product. The term seller may also include, for example, a ticket broker or third party reseller. The seller may then sell the product with a set of conditions that include, in one implementation, at least the initial price and the minimum refund schedule. The conditions could include things such as, for example, the condition that the purchaser cannot transfer ownership of the perishable product to a third party. These conditions and refund schedules could be determined for each offer, resulting in varying time periods and refund amounts as products are offered for sale to various customers over time.

The minimum refund schedule could include the right to access a web portal with information on specific available exchange options and exchange the product for another product for a fee or at no additional cost, e.g., in the case of an airline ticket, this might be all flights available for exchange at no additional cost. The schedule could also include the right to access a web portal to determine the additional cost required to exchange the product for a particular product the customer desires and exchange the product for another product for an additional cost, e.g., how much additional would it cost to exchange the ticket for a flight to New York on December 20. The web portal may be implemented as a web site and service implemented across various platforms, including, but not limited to, the Internet, intranets, computer networks, mobile networks, wireless networks, and e-mail offering a broad array of services including, for example, forums, search engines, shopping, and other tools related to implementing the present invention.

In certain embodiments, immediately following the sale, the seller could send an e-mail or other communications congratulating the purchaser for the purchase and documenting the terms of the agreement including the refund schedule. Then, just prior to the expiration of each refund period, the seller could send an e-mail or other communications reminding the purchaser of the pending expiration and clarifying the refund schedule. These e-mails could contain additional information and offers with links to enable exchanges and additional purchases. During the entire term (or at certain intervals or times) of the schedule, the seller continues to estimate demand for the products. If demand is significantly different than originally forecasted, the seller could make a directed offer to the purchaser with either a hold incentive or a release incentive.

The hold incentive would be designed, in certain embodiments, to encourage the purchaser to hold the product and not elect a refund option. The hold incentive could contain one or more features such as information about the product or destination, an airline mileage credit in an airline promotional program, a discount on a product that is complementary to the first perishable product such as a hotel room or restaurant, a free product, a discount on a service that is complementary to the first perishable product, a free service, a voucher, or other valuable offers.

The release incentive would be designed to encourage the purchaser to elect the refund offer and release the product back to the seller. The seller could then resell the product to others at, hopefully, a more advantageous price to increase overall revenue yields. The release incentive could consist of one or more features such as a full refund, a refund in an amount greater than the initial price, a voucher, an airline mileage credit in an airline promotional program, an exchange for another product or service of equal value to the initial price, an exchange for another product or service of greater value to the initial price, a free product or service, or other valuable offers.

The directed offers could be determined at least in part based upon a profile or knowledge of the purchaser, and wherein the profile includes information about the purchaser. For example, if the purchaser has previously accepted an offer for a discount at a particular hotel chain, a similar offer might be made to that customer in the future. If the customer's profile indicated the customer enjoyed golf or tennis, an offer related to such products could be integrated and included in the directed offer, including release incentive options and hold incentive options.

When a purchaser elects a refund option or a release incentive, the seller will, in most cases, once again make the original product available for sale. The product could be sold at a price less than, equal to, or greater than the original price. The price could also be less than, equal to, or greater than the refund amount or offer value.

Various implementations of this method are envisioned and contemplated. The first minimum refund amount could include a refund in an amount greater than, equal to, or less than the initial price; a cash payment; a voucher; an airline mileage credit in an airline promotional program; an exchange for another product or service of equal value to the initial price; an exchange for another product or service of greater value to the initial price; or an exchange for another product or service of lesser value to the initial price.

The minimum refund schedule could consist of one or more time periods, each period, in one implementation, offering a different refund amount. The minimum refund schedule could include an offer to receive a discount on another product, an offer to exchange the product for a second product, or a credit towards purchasing other products in the future. The other products could be complimentary to the first perishable product.

The first refund opportunity could include the minimum refund schedule and the possibility for the first minimum refund amount to be larger than the initial price based on chance. This refund could include a product. The chance could be determined from a random drawing, a lottery game, or other game of chance.

In still other embodiments, discussed more fully below and illustrated in connection with FIG. 5, an implementation of the present invention may include an offer to sell a first perishable product at defined conditions that do not include a minimum refund schedule, but do include an initial price and a purchaser agreement to receive at least one directed offer via an authorized communications medium. This could result in either a release incentive, a hold incentive or neither.

A method of determining the demand for one of the products after the sale could include offering an option to sell one of the products to a third party at a price higher than the initial price, and receiving an acceptance of the offer of the option to sell one of the products. Determining demand for the products could also consider historical demand, current demand, and current perishable product inventory levels.

The offerings and the acceptances could be done electronically. The payment could be received electronically. A computer could be used in determining demand and refund offers. Virtually any known or available computer/communications system may be utilized to implement any number of embodiments of the present invention, each of which would be understood or known by one of ordinary skill in the art.

This method could be applied to a variety of perishable products including airline tickets, concert tickets, sporting events, other live events, train tickets, theatre tickets, movies, hotel rooms, options to buy real estate, options to invest in time-share real estate, options to buy investment securities, options to buy personal property, an item that is to be auctioned at a future time, a scheduled medical procedure, a scheduled use of medical diagnostic equipment, a car rental reservation, a rental reservation for an object, and an appointment to see a professional.

To illustrate the benefits of the method, a few examples of theoretical implementations of the invention are described below, and later in connection with FIGS. 5 through 14.

An airline example with use of a release incentive is described next. A person is interested in taking their family on a vacation to Hawaii during the next summer. About seven months prior to the trip, the individual starts shopping for air travel. The options available include first class, full fare, and supersaver fares. The only one within the family's budget is the supersaver fare, but the individual is hesitant to commit so far in advance with a non-refundable fare, especially given that one of the kids is contemplating a missions trip with their church youth group during the same time. The individual, however, finds an airline that offers the FLEXPASS option implementing an aspect of the present invention. The fare is the same as the supersaver or discount fare, but it includes exchange options and guaranteed refunds that decline as the flight approaches.

The airline calculates a refund schedule for that particular customer that has four refund option periods: 95% for the first 90 days, 85% for the next 60 days, 75% for the next 30 days, and 50% up until 48 hours prior to departure.

The individual or purchaser chooses FLEXPASS and provides their credit card information to purchase 4 tickets at $549 each. The airline sends an e-mail congratulating him for the smart decision, explaining the program, and detailing his exchange options and refund offer windows. As the end of each refund window approaches, the airline sends an e-mail reminder, assuming the individual did not opt out of such email reminders, of dates and refund options and uses the e-mail to promote special offers and other programs. The present invention may include any number of refund offer windows or sub-periods or windows therein. For example, a refund window may include a decrementing refund amount each day (or some time period), such that the window extends up until or near the expiration date of the perishable product. This type of refund offer window may be thought of as one variable refund offer window, or it may be thought of as numerous refund offer windows each with a different refund amount. At 21 days out, demand for the flight prices seats to Hawaii at $1,200 and the airline projects that it can sell more seats than it has available. So, the airline sends him an e-mail with a release incentive, offering an enhanced $800 refund per seat, promoting 3 alternative beach destinations priced below $800, and includes hotel discounts at the other 3 destinations. The customer decides to accept the $800 and switch to Cozumel at $550. Therefore, he has $1,000 in spending money ($250 per ticket) and will be saving 40% on the hotel. The airline then re-sells the four Hawaii seats at $1,200, realizing $3,800 in incremental revenue ($400 per Hawaii seat and $550 for each Cozumel seat that otherwise may have been empty).

An airline example with use of a hold incentive is described next. This example is like the Hawaii example above where the customer buys four seats to Hawaii for his family and chooses the FLEXPASS option. This example, however, has a different outcome. At 21 days prior to the flight, demand for the flight is below original forecasts; Hawaii seats are being discounted to $499, and the airline projects that there will likely be empty seats. The airline has collected data from prior transactions that indicate the customer has utilized discount coupons to a certain hotel chain in the past that has a Hawaii property. So, the airline sends him an e-mail with a hold incentive promoting the hotel and providing a discount coupon. The e-mail also features the great Hawaii weather, promotes exciting activities, and provides coupons to several attractions. The customer was contemplating other options, but the promotions influence him to keep his Hawaii plans. Several of these situations on this flight enable the airline to firm up demand and sell all remaining seats. The airline avoids lost revenue on potential empty seats.

A concert example is described next. A popular artist is making an appearance at a large venue in a major city. Floor seating is priced at $80 per seat. An individual purchases 3 tickets and receives $5.00 off each ticket for choosing the FlexPass option. The tickets are issued as an e-ticket via e-mail and bar coded with a serial number. One week before the concert, the concert is sold out and tickets are bringing $300 on third party exchange platforms. The concert organizer sends an e-mail to the purchaser offering her $150 per ticket plus a limited edition "best of" CD and an autographed poster of the artist. The purchaser accepts the offer and the e-ticket serial number is invalidated. The organizer resells the 3 seats for $300 each, realizing $450 in incremental revenue, (300−150)*3, and incurs $25 in additional costs related to the CD, poster, and transaction.

Similar examples can be envisioned related to Broadway plays, ballets, operas, symphony orchestras, sporting events, hotels, all-inclusive resorts, cruises, and other perishable products, as defined herein.

The use of this invention could increase sales and promote sales further in advance by making it easier for the customer to commit to the purchase because of the exchange and refund options, when the customer would otherwise be hesitant to commit; and facilitate the re-sale of products; thereby increasing revenues and providing additional cash flow to the provider. The proper implementation and operation of the invention has the potential to significantly increase a provider's profitability, create a competitive advantage over companies without the invention, increase average unit revenue, encourage advance purchases, provide a robust demand management tool for both high demand and low demand products, create a profitable two-way marketing channel, and strengthen the customer relationship.

FIG. 1 is a block diagram of a system for a seller to sell a plurality of limited perishable products available for sale, each one of the plurality of limited perishable products of the same (or similar) type and each one having the same (or similar) expiration date according to an embodiment of the present invention. This may include client and server computers in communication with one another through a network, such as a network 200 as shown in FIG. 1. The system may include one or more seller devices 100, and a plurality of buyer devices 300 in communication with one another through the network 200. The network 200 may be the Internet, an intranet, a local area network, a wide area network, a collection of numerous networks, wireless network or networks, or virtually any communication link.

In operation, a purchaser may use one of the buyer devices 300, which may be implemented as client devices, using the network 200, to communicate with one or more of the seller devices 100, which may be implemented as a server or distributed clients, so that a perishable product or service may be purchased according to the invention. Each of the seller devices 100 may be viewed, in one implementation, as separate systems implementing an aspect or aspects of the present invention to sell a plurality of perishable products. In other embodiments, the multiple seller devices may be viewed as a redundant or distributed system for increased system reliability and performance.

Figure 2:
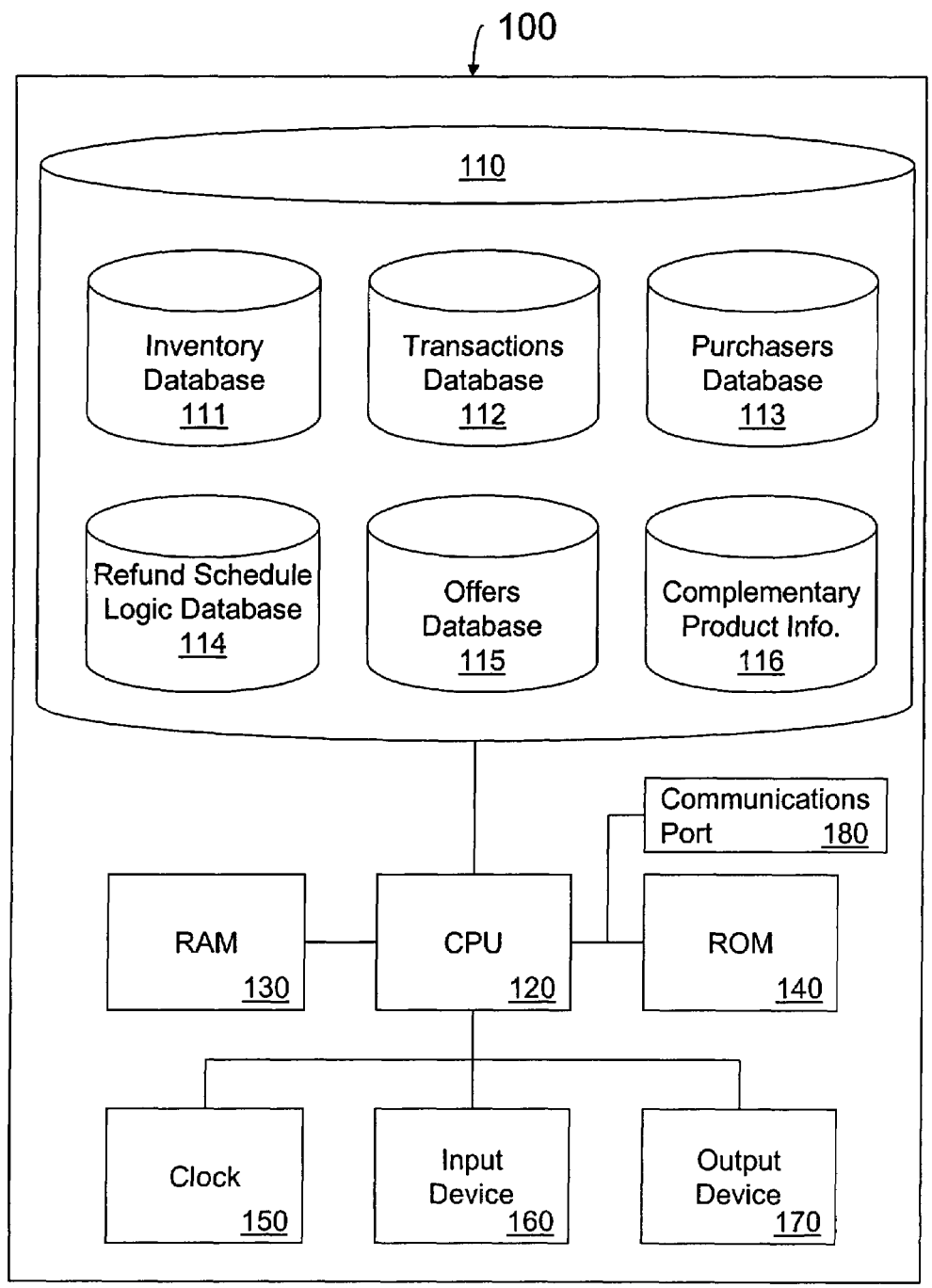
FIG. 2 is a block schematic diagram of the seller device shown in FIG. 1 according to an embodiment of the present invention.

FIG. 2 is a block schematic diagram of the seller device 100 shown in FIG. 1 according to an embodiment of the present invention. Although illustrated as one unit, it should be understood that the various elements of seller device 100 may actually be implemented on various disparate computers and databases to achieve the desired functionality. Conversely, some of the elements of the seller device 100 shown as separate elements may actually be integrated into the same element.

The seller device 100 includes a storage media 110, such as a hard drive or magnetic or optical storage media to store a plurality of databases, such as an inventory database 111, a transactions database 112, a purchase database 113, a refund schedule logic database 114, an offers database 115, and a complementary product information database 116. These data repositories are used by a CPU 120 (or multiple CPUs), which may also be referred to as a processor 120, for executing computer or machine code instructions provided by computer software. A RAM 130, and a ROM 140 serve as memory or media for the CPU 120 so that computer instructions and/or data may be stored temporarily or as needed while the seller device 100 performs the method, or aspects of the method to sell a perishable product or service. A clock 150 is provided so that appropriate clock cycles and timing can be maintained by the seller device 100.

Various I/O devices or elements are illustrated in FIG. 2. For example, an input device 160, an output device 170, and a communications port 180, so that data may be input or output from the device as required. The output device 170 may be, for example, a video monitor or a storage device, such as a CD or DVD recorder. Depending on various factors and as desired, the seller device 100 may be implemented as a mobile phone, a personal computer, a laptop computer, a server, a wireless device, a data appliance, and the like. One of ordinary skill in the art could implement one or more aspects of the invention in virtually any available or desired computer system or systems, or networks.

Figure 3:
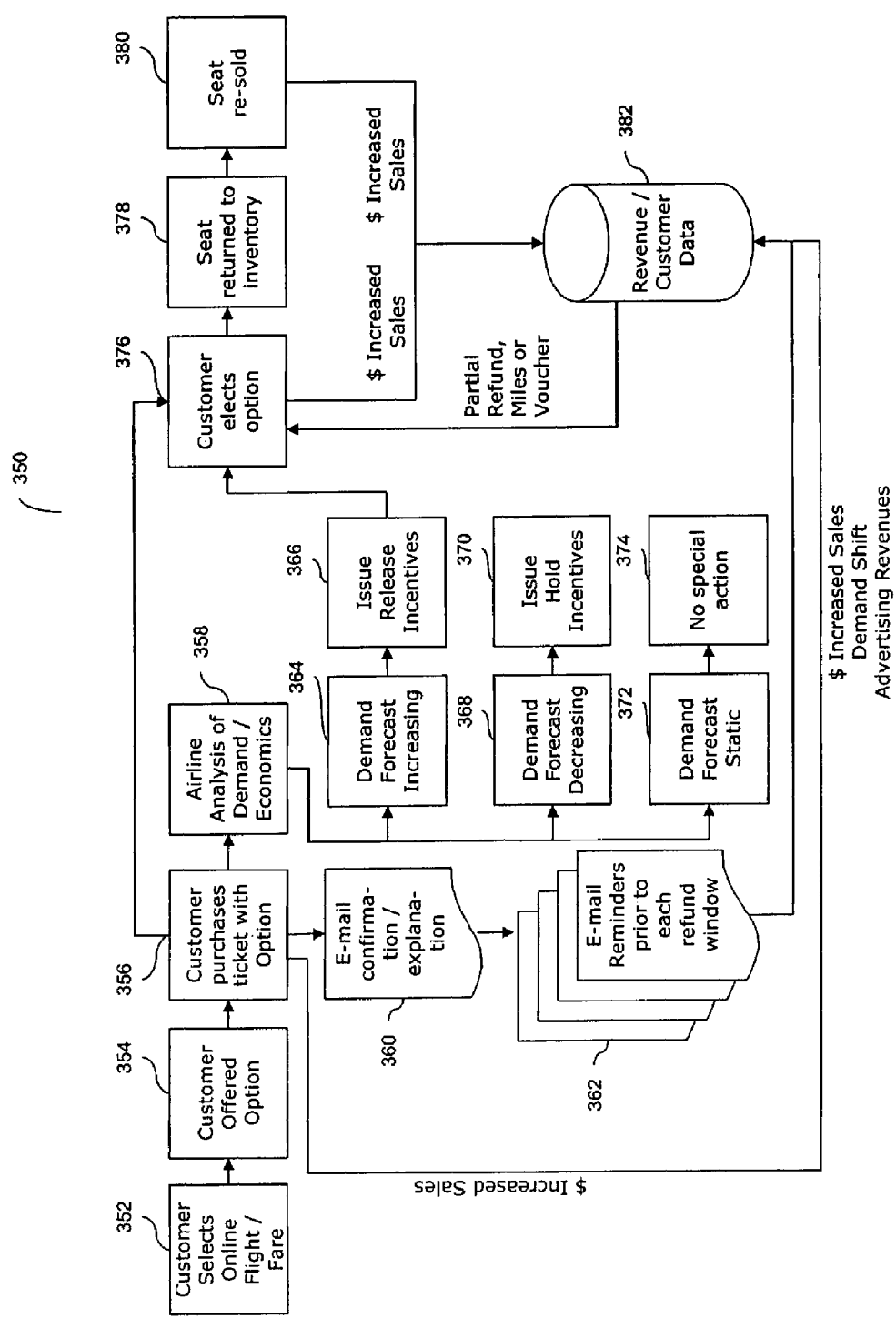
FIG. 3 is block diagram illustrating an example of an airline implementation of certain aspects of the present invention.

FIG. 3 is block diagram 350 illustrating an example of an airline implementation of certain aspects of the present invention. FIG. 3 generally illustrates an example method of implementation for an airline with components of the block diagram referenced with numbers. In one embodiment of the invention, an airline with rights to the invention could offer the option on its electronic commerce portal (i.e., Internet web site) at no additional cost with each flight/fare combination. The options could include 1) even exchange options on select alternative destinations and/or schedules, 2) additional cost exchange options for any available destination or schedule, and 3) guaranteed refunds.

The even exchange option could consist of flights for which demand and economics indicate an advantage to the airline if the customer were to make the exchange. The additional cost option could include any flight with seats available with the additional cost determined based on an analysis of economics and demand patterns and priced to improve the airline's profitability. This option could also be enhanced with a further option for the customer to use frequent flyer miles or other means in lieu of all or part of the difference in price.

The guaranteed refund option, in certain embodiments, could consist of one or more refund windows, or time periods, each having a guaranteed minimum refund available. The time periods and guaranteed minimum refund amounts could be based on forecasted demand patterns and ticket values. A feature could be included that offered significantly enhanced refund offers to a limited number of purchasers based on chance. The option could be expanded to offer the refund in the form of a credit to the purchaser's credit card, bonus frequent flier miles, a voucher good towards future flights, or some combination of these. In the case of the voucher, the airline could elect to send periodic e-mails reminding the customer of the voucher and offering various promotions, products, or special offers.

The system or process may begin at the block 352 where the customer accesses an airline reservation system and selects a particular flight. In addition to standard air fare ticket options, such as a discount, non-refundable ticket, and a full fare refundable coach or first-class ticket, the user may also be offered the option, at the block 354, to use one or more aspects of the current invention. This will generally include, in one embodiment, an offer to buy a ticket at (a) an initial price, and (b) a minimum refund schedule. In other embodiments, this may include (a) an initial price, (b) an incentive relative to the other or another offer to buy this ticket, and (c) a purchaser agreement to receive at least one directed offer, which may include a hold incentive, a release incentive or neither.

Once the option is selected at the block 356 and the sale is made revenue is provided to the airline as illustrated by the arrow to revenue/customer database 382, the airline may confirm the transaction and explain the terms, exchange options, and refund windows via e-mail or other communication at block 360, explaining that additional e-mails may follow containing promotions and offers. The airline could make available a special area of their web site (such as through a link in their email to the customer) to access and transact full and partial credit exchange options. The site could generate in real-time even exchange options based upon current demand forecasts and prices. The site could also price the additional cost required to exchange for any available flight or schedule based upon current demand forecasts and prices.

In the implementation with a refund schedule, the airline may send an e-mail reminder to the customer prior to the expiration of each refund window as shown at block 362. These e-mails could contain promotions, directed offers, and ads with the ability to influence demand towards or away from the flight, and transact additional business including travel related services such as hotels and rental cars; special offers to enhance the refund amount and/or bonus frequent flier miles; and special offers to exchange for other flight times and/or destinations with the ability to transact these offers by linking the customer to the airline's web site. These offers could be based on an analysis of demand patterns as illustrated at block 358, and may be designed to influence customers to retain their current flight, as illustrated at blocks 368 and 370, or accept offers on flights with high demand and in some cases switch to flights and/or destinations with lower demand as illustrated at blocks 364 and 366. These offers may be tailored to the individual purchaser utilizing data about the purchaser's preferences and tendencies collected from prior transactions or from a user or purchaser profile, such as that previously collected and stored at block 382. The purchaser or user could be notified of any release incentive, which may be generated at block 366, any hold incentive, which may be generated at 370, or other offer via email. In other embodiments, neither a hold incentive nor a release incentive is presented to the customer because the analysis of the demand at block 358 may not justify such an offer. This is illustrated by block 372, where demand may be static or not active or changed enough to justify either a release incentive offer or a hold incentive offer to the user or customer, and block 374.

The resulting benefits to the airline include additional sales, sales further in advance, profits from the original sale where the sales price exceeded the refund amount, higher revenues on low demand flights, re-selling the vacated seat at a higher fare as shown in blocks 376, 378 and 380, additional sales from promotions and offers, increased customer loyalty, and advertising revenue though such promotions and advertising emails and/or web portals.

The resulting benefits to the purchaser/consumer could include making the purchase commitment easier, providing flexibility via exchange and partial refund options, providing valuable offers, some of which may be customized and unique to that particular customer based on a profile of the customer, and potentially providing refund offers whose value exceed the original purchase price. The flow of money back to the customer may be illustrated from block 382 to block 376.

Figure 4:
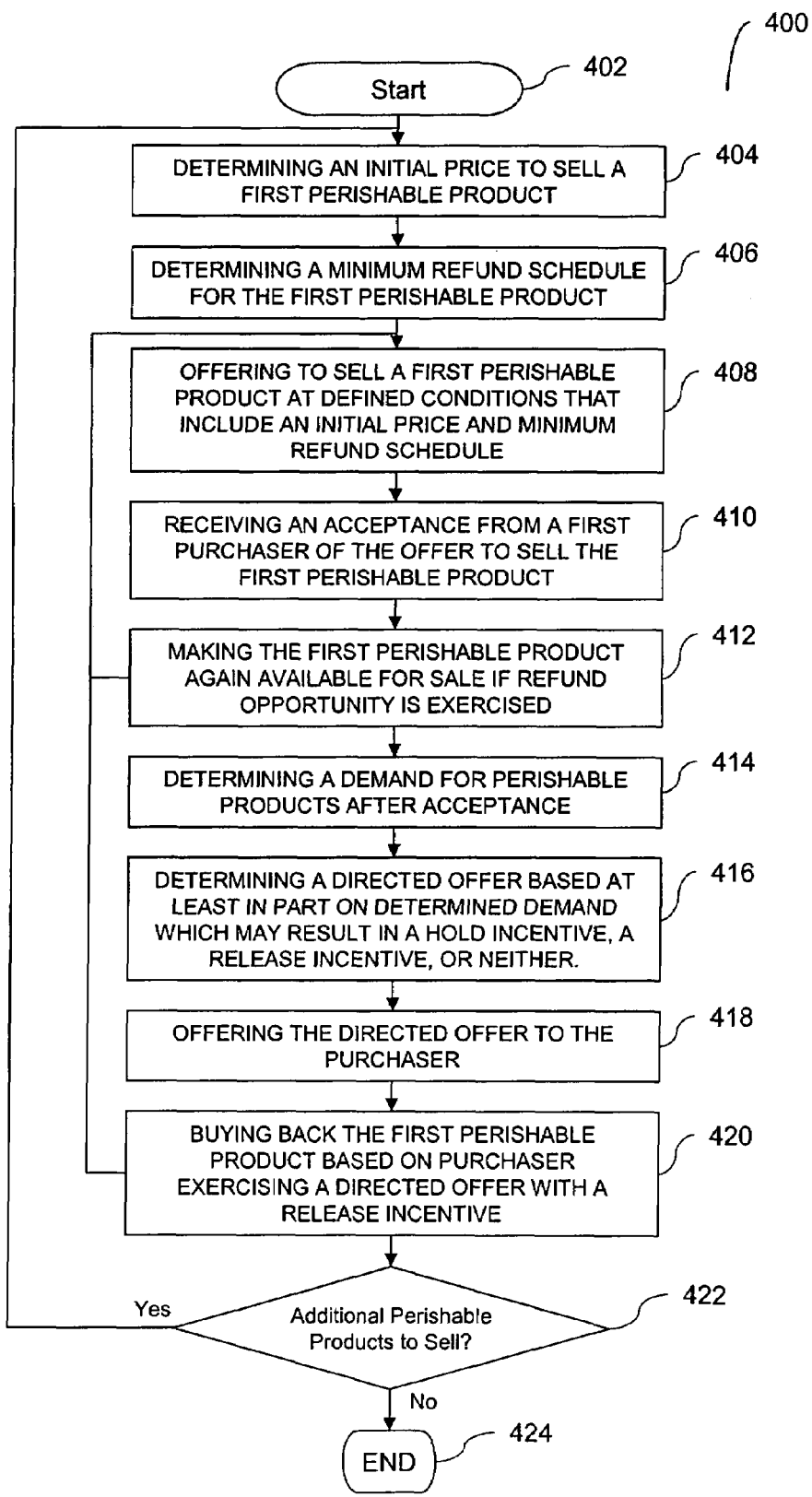
FIG. 4 is a flowchart of a method for a seller to sell a plurality of limited perishable products, according to an aspect of the present invention.

FIG. 4 is a flowchart of a method 400 for a seller to sell a plurality of limited perishable products, each one of the plurality of limited perishable products is the same type (which may be defined herein to include a similar type) and each one having an expiration date, which may occur on the same date or near the same date. For example, the plurality of limited perishable products may be, for example, (a) the same or different class of seats, such as business class or coach, etc., on a particular airline flight; (b) the same or different class of seats on multiple airline flights from the same destination to another destination that are scheduled around the same time, such as the same day, weekend or week, for example; (c) similar products being auctioned online with similar expiration dates, such as during the same week, for example; or (d) different concert tickets to the same concert or a series of concerts that occur the same day, weekend or week, for example.

The method 400 is one embodiment or implementation of various aspects of the invention, and the present invention should not be limited only to such an embodiment or implementation. The method 400 begins at start block 402 and proceeds to block 404 where an initial price is determined in which to sell a first perishable product. In one implementation, the initial price may be preset at a defined value for numerous perishable products, which may be thought of as determining an initial price to sell a first perishable product. In other cases, economic studies, such as demand analysis, may be performed to assist with determining the initial price. The determination of the initial price for multiple perishable products may be initially done at the same time or may occur at separate times.

The method 400 may proceed next to block 406 where a minimum refund schedule for the first perishable product may be determined. In one embodiment, the minimum refund schedule may include a first refund opportunity with a first minimum refund amount that may be elected by a purchaser during a first refund time period. For example, the first minimum refund amount may provide a dollar refund, such as a full or partial refund, or a product exchange, such as, for example, an airline ticket to another destination or at a different time. In other embodiments, a voucher may be provided as the first minimum refund amount. The first refund time period may include one "window" or period of time, or it may include multiple windows or periods of time. Different minimum refund amounts may be provided for each period of time. The minimum refund amount may include any of a variety of items, including those mentioned below in connection with the release incentive option and the hold incentive option.

It should also be understood that the minimum refund schedule may include, depending on the particular implementation, a plurality of refund time periods or refund "windows." In a preferred embodiment, the minimum refund amount is reduced as time progresses toward the expiration date. Of course, a release incentive (discussed more fully below), triggered by increased demand for the perishable product, may result in a release incentive that actually increases the refund opportunity for the purchaser, in certain embodiments.

In some implementations, a minimum refund amount will be provided to the purchaser with the additional opportunity to receive a larger refund amount. This opportunity may be provided through a lottery, random drawing or other game or system of chance. This provides additional potential incentive to have buyers purchase using this system.

Proceeding next to block 408, the first perishable product may be offered for sale at first defined conditions that include at least the initial price, discussed above in connection with block 404, and the minimum refund schedule, discussed above in connection with block 406. In a preferred embodiment, this offer will be provided electronically, such as through a web portal or networked computer system that allows multiple consumers to view the offer to sell the first perishable product.

A perishable product, or a plurality of perishable products, may include any of a variety of goods or services, such as an airline ticket, a concert ticket, a sporting event ticket, a ticket to a live event, a train ticket, a theater ticket, a ticket to a movie, a hotel room reservation, an option to buy real estate that expires at a future time, an option to invest in a time-share real estate that expires at a future time, an option to buy an investment security, an option to buy personal property, an item that is to be auctioned at a future time, a scheduled medical procedure, a scheduled use of medical diagnostic equipment, a car rental reservation, a rental reservation for virtually any item, an appointment to see a professional, a right to buy an item at a specified price so that it is not subject to an auction process (such as the BUY IT NOW feature used on the EBAY auction site), and related items. If desired, other options or conditions may also be included as part of the defined conditions.

A plurality of limited perishable products may include, for example, a plurality of airline tickets on the same flight, a plurality of airline tickets of the same class on the same flight, a plurality of coach class airline tickets on the same flight, a plurality of airline tickets on a plurality of flights to the same destination on a plurality of dates, a plurality of airline tickets on a plurality of flights to a same destination on the same day, a plurality of concert tickets for the same show on the same date, a plurality of concert tickets to a performance on a plurality of dates, a plurality of event tickets on the same date, and a plurality of event tickets to a performance on a plurality of dates.

Proceeding next to block 410, a consumer, buyer or user, such as the first purchaser, accepts the offer to sell first perishable product, as described above in connection with block 408, and the acceptance is received by the seller. In a preferred embodiment, this is done electronically such that the first purchaser electronically accepts the offer, and preferably, provides for electronic payment at the time of acceptance. In other implementations, the acceptance may be assumed or derived from the payment by a first purchaser to the seller.

In one implementation of the method 400, the first purchaser (or any subsequent purchaser of any of the plurality of products or tickets), may be electronically queried regarding their desire to receive email updates and/or reminders regarding the minimum refund schedule, and associated refund time period or refund time periods. For example, if the minimum refund schedule includes three refund time periods, the first purchaser may be electronically notified initially and before the beginning and expiration of each period. In one embodiment, the email notifications may include hyperlinks to a web portal where refunds and options may be elected and exercised. In certain implementations, the purchaser may elect not to receive any email reminders, or minimal email reminders, while another purchaser may desire and elect to receive many email reminders. It should be noted and understood that the purchaser as used herein may include an agent of another to purchase a product.

Proceeding next to block 412, the first perishable product may be made available for sale again if the first purchaser exercises the refund opportunity. For example, the first purchaser may request a refund, as provided in the defined conditions discussed above in connection with block 408, during a refund time period, such as the refund time period or some subsequent refund time period. If so, the first perishable product may be offered for sale again and the method 400 may proceed back again to block 408, or in other embodiments back to block 404 where an initial price may be determined at such time for the first perishable product. Assuming that the first purchaser does not exercise the refund opportunity at block 412, the method 400 proceeds to block 414.

At block 414, a demand for one of the plurality of limited perishable products may be determined. Depending on the implementation, this may be done for one of the perishable products or for a desired number of the plurality of perishable products, and is preferably done while the purchaser still has the opportunity to receive a refund or exchange for the perishable product. As a consequence of determining the demand, which may be determined using any available or known method, including historical demand, current demand, or predefined demand levels, the directed offer may be generated as discussed below in connection with block 416. The determination of a demand for a perishable product or products after a perishable product has been sold but the product is still susceptible to being returned by the purchaser, may include any known method of determining, correlating or estimating demand. For example, demand may be estimated or correlated based upon inquiries about a perishable product, offers to purchase a perishable product, actual purchases of a perishable product by others, and any other available or later known method of determining demand or correlating demand through a different mechanism.

At block 416, a directed offer is determined. This directed offer may be based at least in part on the determined demand, as discussed above in connection with block 414, which may result in a hold incentive being generated or a release incentive being generated and then offered to the first purchaser. In other embodiments, the determined demand is such that neither a hold incentive nor a release incentive is generated. For example, if the first perishable product is an airline ticket, which may be one airline ticket from a plurality of airline tickets on the same flight, the first perishable product may have been purchased many months before the flight departure date. As the date approaches, the demand for the flight may unexpectedly increase for a variety of reasons. In such a case, the seller, such as an airline or ticket broker or ticket reseller, may desire to have the ticket back so that it may be resold at a higher price. The purchaser, of course, has no obligation to resell the ticket to the seller, but the seller may entice the purchaser to return the ticket through what may be termed a release incentive. For example, the refund amount may be increased to a level that motivates the first purchaser to return the ticket. Other incentives, such as discounts on other flights or similarly themed destinations and/or attractions, such as those determined based upon user's profile, may also be included in the release incentive.

In another example, the demand for the ticket or tickets may have substantially decreased, as determined at block 414, and, as such, the seller may decide to enhance or encourage the purchaser to retain the perishable product, i.e., the airline ticket. In one implementation, method 400 may include a profile of the first purchaser which includes various interests, likes and dislikes of the first purchaser. Based upon such a profile, the hold incentive may include coupons, passes, event tickets, vouchers, exchange options and the like, to encourage the first purchaser to retain the airline tickets. As can be seen, the directed offer provides a powerful demand management or yield management tool to maximize overall revenue while providing enhanced options to consumers.

In one embodiment or implementation, the release incentive and/or the hold incentive is selected based upon the seller's profile. In a preferred implementation, this is stored and is electronically available to the system of the present invention to assist with determining the purchaser's likes and dislikes in order to properly motivate the purchaser.

Proceeding next to block 418, the directed offer is offered to the purchaser. The hold incentive option may include any of a variety of inducements such as, for example, an airline mileage credit, a discount on a product that is complimentary to the first perishable product, a free product, a discount on a product, a discount on a service, a free service, a voucher, a rebate, and a gift card, for example.

The release incentive option may include, in one implementation for example, any one or more of the following: a full refund, a refund in an amount greater than the initial price, a voucher, an airline mileage credit in an airline promotional program, an exchange for another product or service of equal value to the initial price, an exchange for another product or service of greater value to the initial price, a free product or service, and a gift card.

At block 420, in the case of a release incentive, the purchaser may exercise, elect or accept the release incentive and the seller shall buy back the first perishable product according to the terms of the release incentive. In such case, the method 400 proceeds back to block 408 where the first perishable product is preferably sold at a higher price. In other embodiments, at block 420 the method 400 proceeds back to start block 402 so that the method 400 may proceed again from that point.

Proceeding next to decision block 422, one or more additional perishable products from the plurality of limited perishable products may be processed and sold according to method 400.

In a preferred implementation, users or purchasers may access the system remotely to access the method 400 through any network device, including personal computers, PDAs, mobile phones, and virtually any known or available device that allows access to the system through a wired or wireless interface or network. Similarly, all payments are preferably made electronically, and all notices and notifications are made electronically through a web portal or other GUI interface. In a preferred embodiment, the method 400 is performed through an electronic commerce system and/or computer-based system, such as an Internet implemented commerce system.

Figure 5:
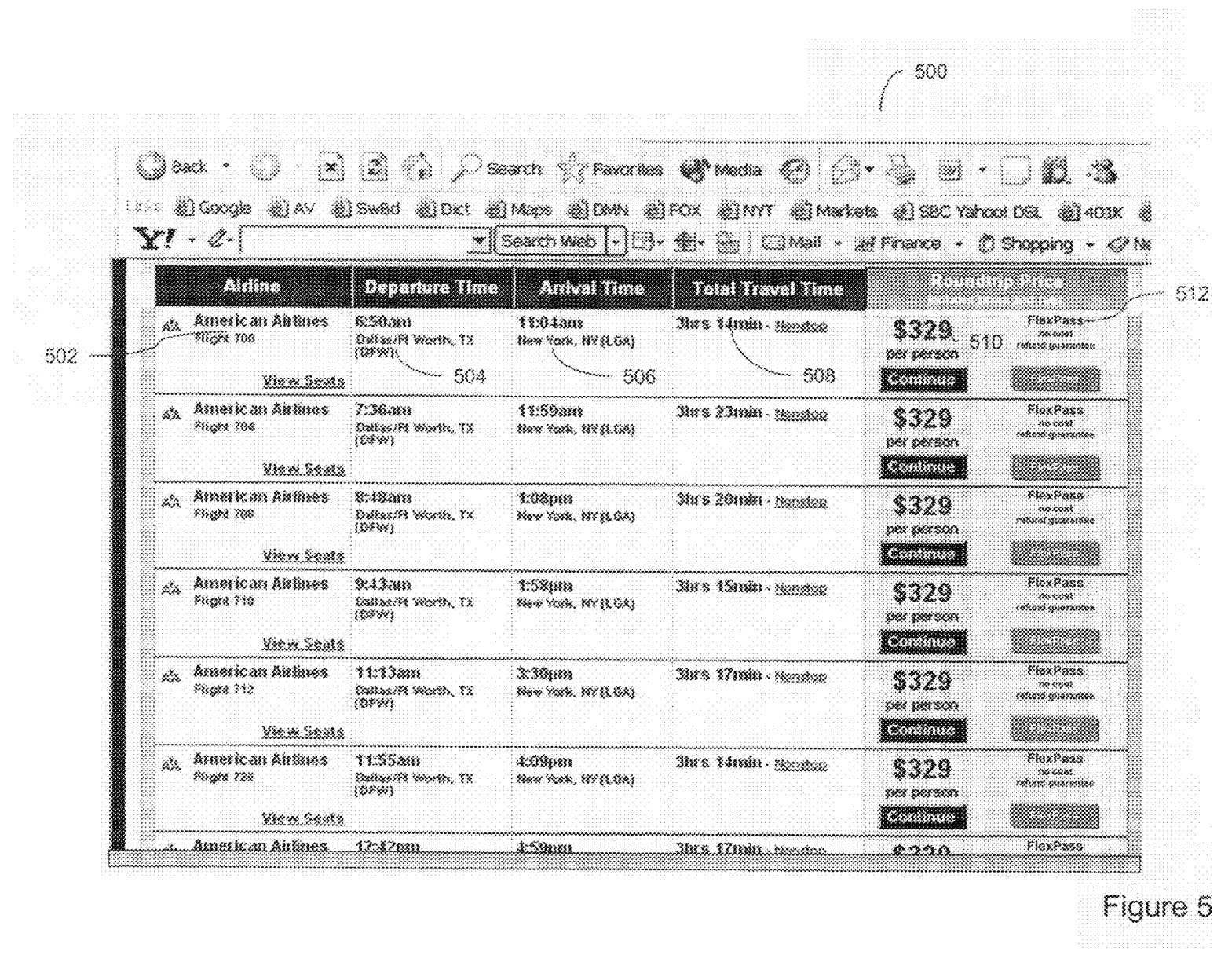

FIG. 5 is a graphical user interface 500 illustrating an implementation of the system and method offering to sell airline tickets using an implementation of the present invention, and as marketed under the FLEXPASS brand. The graphical user interface 500 illustrates a web browser implementation showing various flights in rows, and with the option of purchasing the ticket outright without the features or an implementation of the present invention, or to purchase an airline ticket using the FLEXPASS option as shown.

Block 502 identifies an airline and flight number for a particular flight, which will have a plurality of limited perishable products, i.e., the available seats for sale on this flight, according to an implementation of the present invention. Block 504 shows a departure time and block 506 shows an arrival time. Block 508 shows total travel time, while user selected portion 510 and user selected portion 512 are available to be selected by the user to purchase this airline ticket, which may be referred to as a product or item.

If user selected portion 512 is chosen, the FLEXPASS option is selected and the user is prompted and provided information according to the particular implementation of the system and method of the present invention.

Figure 6:
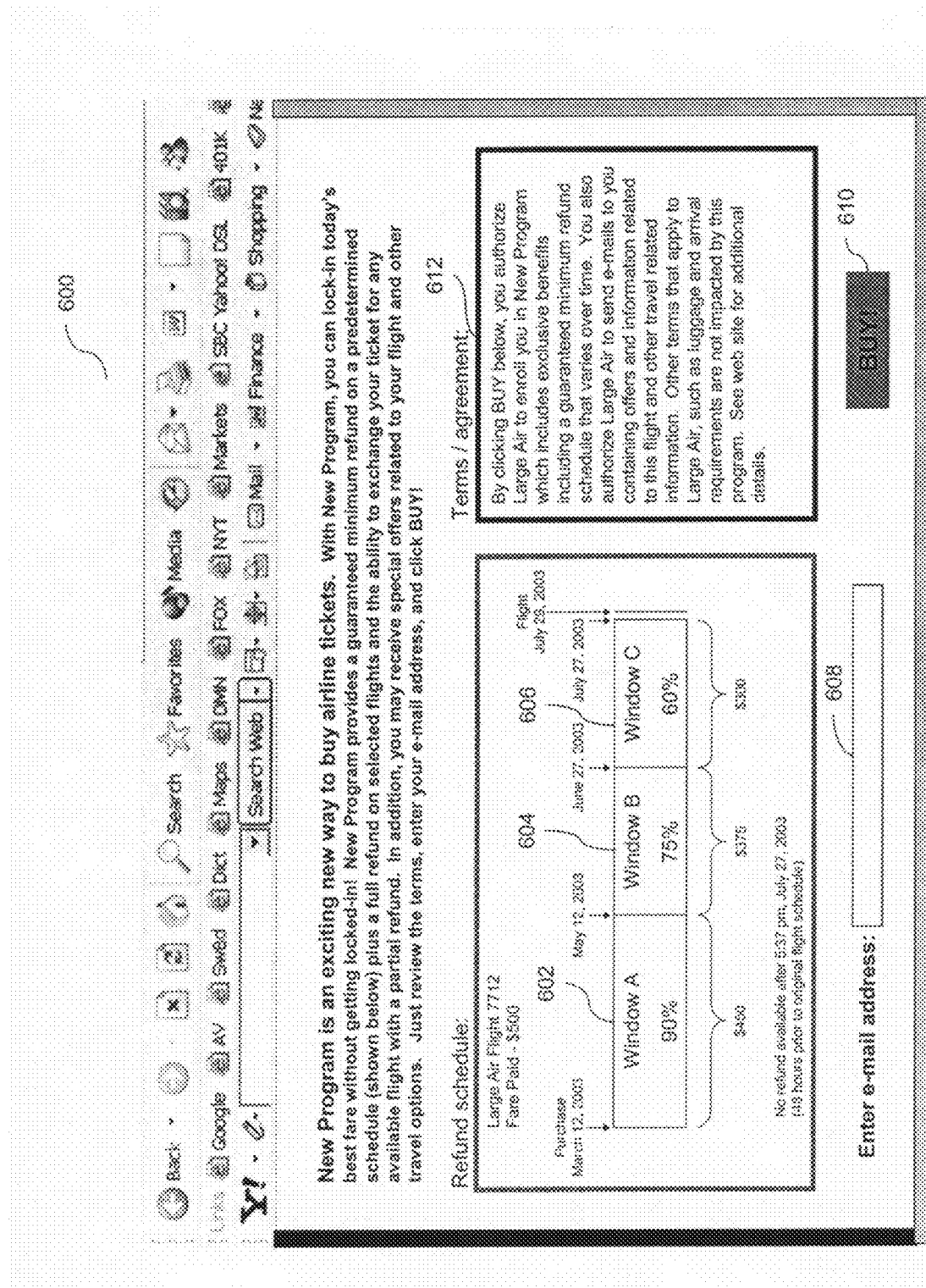
FIG. 6 is a graphical user interface of an implementation of the method showing what may be displayed to a user/purchaser after selecting the FLEXPASS option as illustrated in FIG. 5.

FIG. 6 is a graphical user interface 600 of an implementation of the method showing what may be displayed to a user/purchaser after selecting the FLEXPASS option as illustrated in FIG. 5. Graphical user interface 600 displays a minimum refund schedule that, according to this implementation includes a first refund window 602, a second refund window 604, and a third refund window 606. An email address (or some communications address or identifier) is entered at block 608 so that the provider or seller can communicate with the buyer, especially if a directed offer, such as a release incentive option or a hold incentive option is communicated to the consumer. A terms/agreement is provides at 612 that the user may agree to by selecting buy option 610 of FIG. 6.

The first refund window 602 illustrates a 90% refund offer that extends between Mar. 12, 2003 and May 12, 2003. The second refund window 604 illustrates a 75% refund offer that extends between May 12, 2003 and Jun. 27, 2003, while the third refund window 606 illustrates a 60% refund offer that extends between Jun. 27, 2003 and Jul. 29, 2003, which will preferably be implemented at some predefined period before the flight, which may be referred to as the expiration date. This may allow the airline ample time to fine tune last minute yield management decisions. FIG. 6 illustrates the simplicity in which a user interface may be provided to make such an option easy and attractive to consumers.

Figure 7:
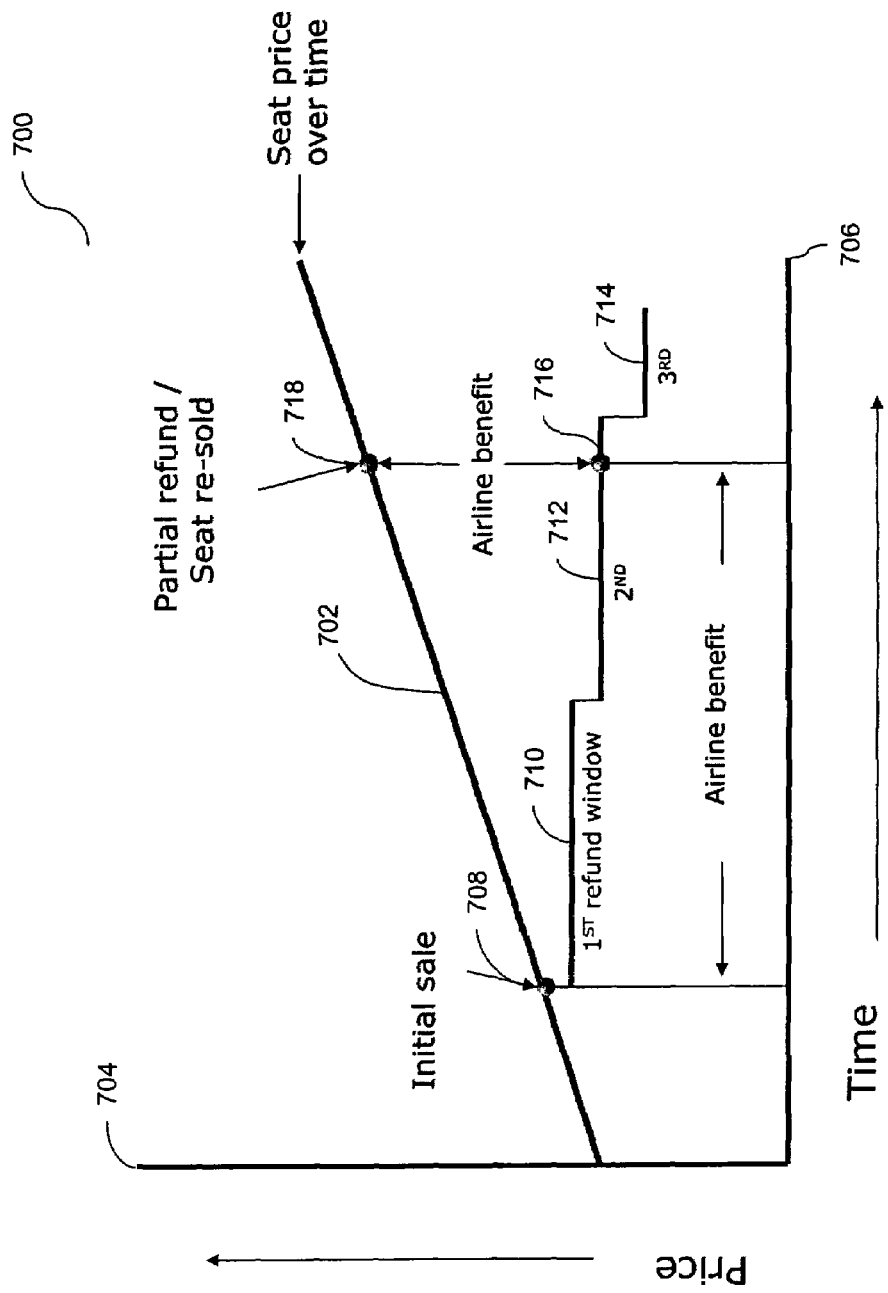
FIG. 7 is a graph illustrating a demand curve for an exemplary airline ticket, and a refund schedule with three refund windows, with a refund and subsequent airline benefit for such a refund.

FIG. 7 is a graph 700 illustrating a demand curve 702, with the time axis 706 and the price axis 704, for sales of an exemplary airline ticket. A refund schedule with three refund windows is illustrated, with a refund and subsequent airline benefit for such a refund also illustrated. An initial sale is made at point 708 at a particular price and time on the demand curve 702. The first refund window 710 extends therefrom to the second refund window 712. During this time, the airline or airline ticket seller is benefiting through the availability and use of such funds during this time.

At point 716, the customer or user elects the refund opportunity and receives a refund. The demand curve at such time is illustrated, in this example, at point 718. The difference in refund price and the price that the ticket can be resold is illustrated between the point 716 and the point 718, which, as illustrated, can be substantial.

Figure 8:
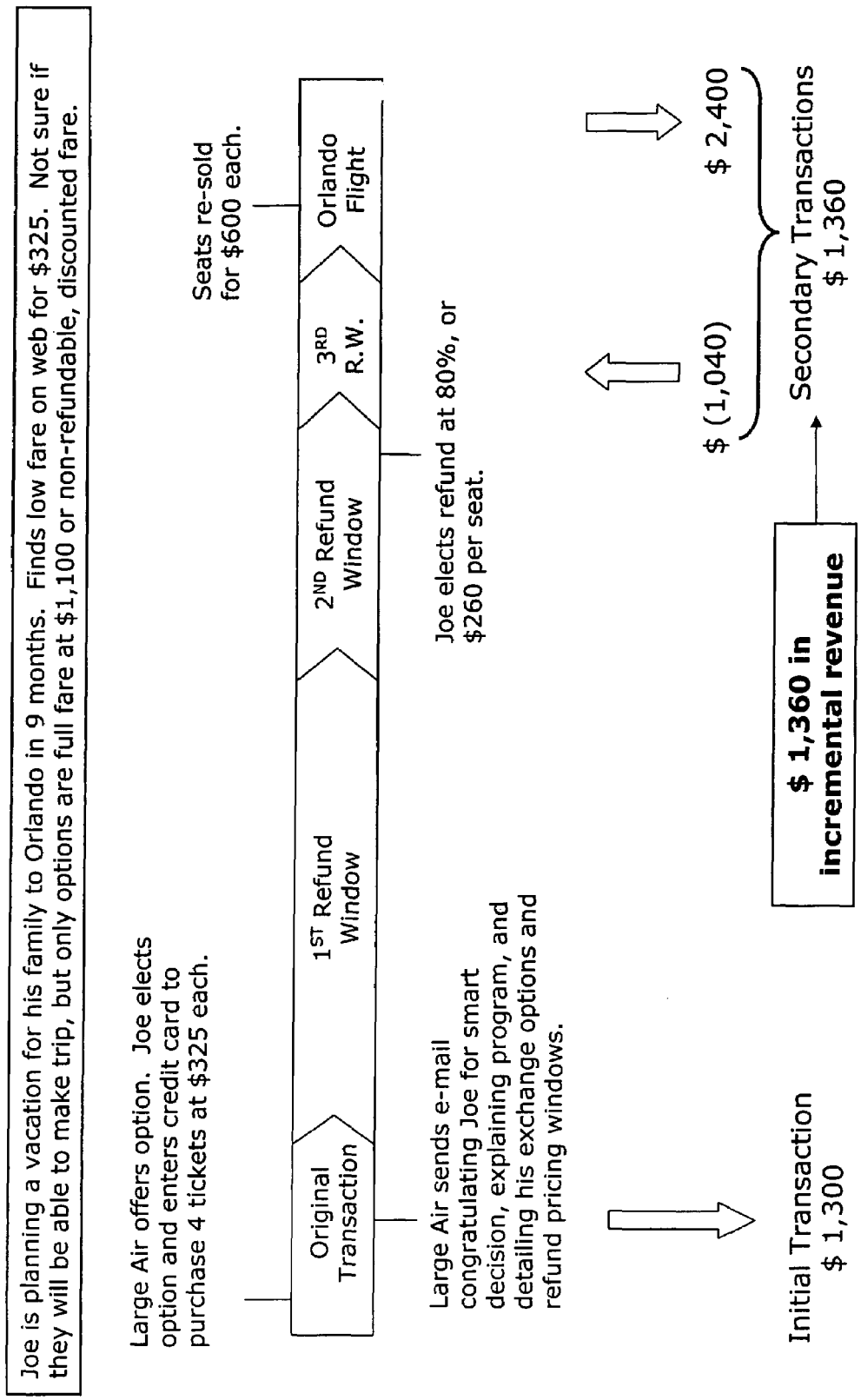
FIG. 8 is an illustrated timeline demonstrating a customer using an aspect of an embodiment of the invention and requesting an airline ticket refund from a refund window of a minimum refund schedule, and the airline reselling the ticket.

FIG. 8 is an illustrated timeline demonstrating a customer using an aspect of an embodiment of the invention and requesting an airline ticket refund from a refund window from a minimum refund schedule, and the airline reselling the ticket. Various ways in which a specific embodiment of the present invention may be implemented are illustrated, and includes emailing the purchaser after making the initial purchase and providing all of the various options, including the minimum refund schedule and corresponding time constraints. During the second refund window, the user elects a refund. At such time during this particular implementation, when the user elects a refund, he receives 80% of his ticket price back, which is less than a normal exchange fee in many instances, and the airline benefits by being able to resell the ticket at a greater amount, and while benefiting by using the consumers money before the consumer elects a refund. This results in benefits for the consumer and $1,360 in incremental revenues for the seller.

Figure 9:
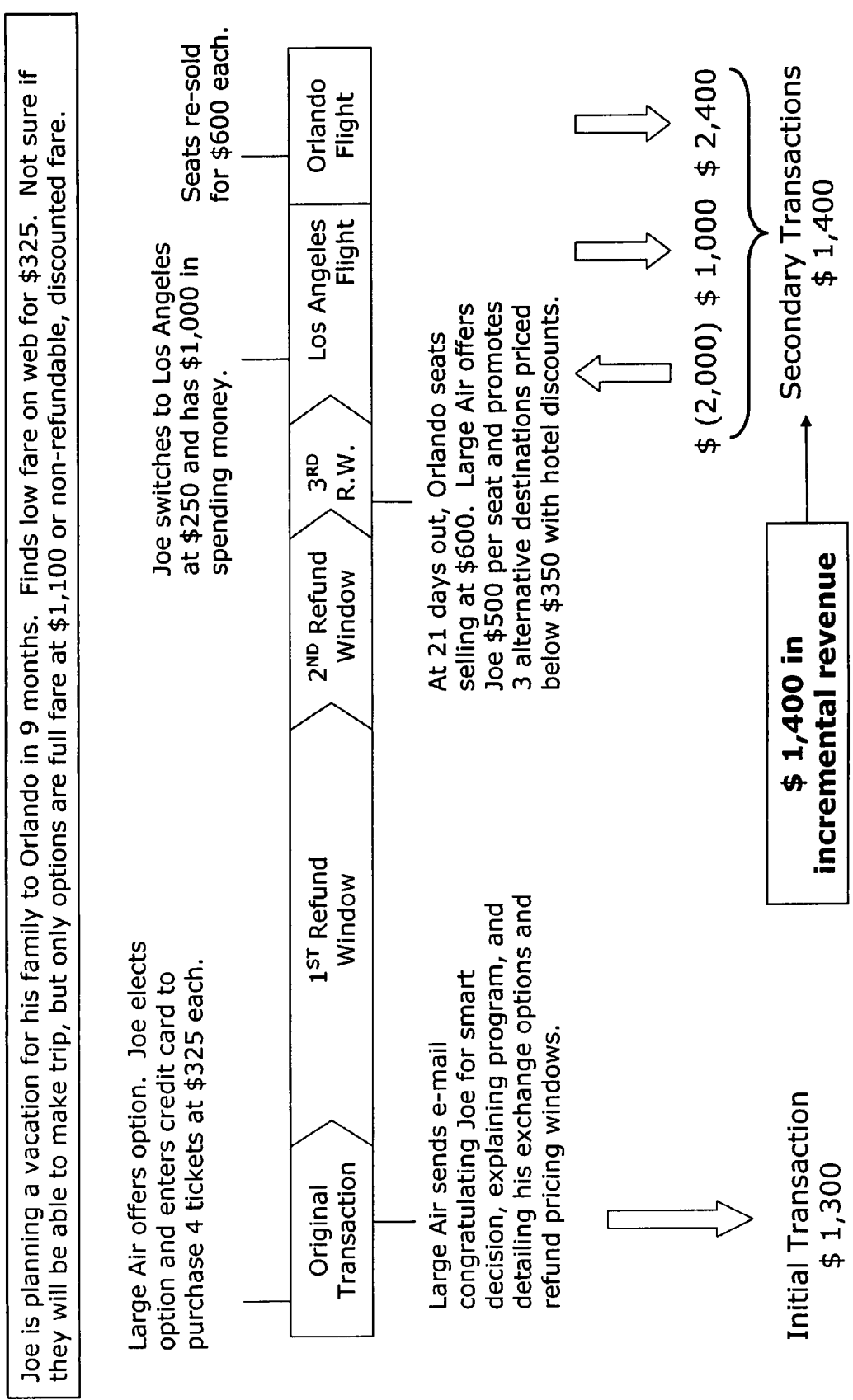
FIG. 9 is an illustrated timeline demonstrating an airline ticket seller offering a customer a release incentive during a refund window of a minimum refund schedule, and the customer accepting the release incentive and the airline ticket seller reselling the ticket.

FIG. 9 is an illustrated timeline demonstrating an airline ticket seller offering a customer a release incentive during a refund window of a minimum refund schedule, and the customer accepting the release incentive and the airline ticket seller reselling the ticket. The seller determines that the demand for the flight is great enough to trigger a release incentive option to the consumer to attempt to buy back the ticket. This may be at virtually any price, including at a price greater than the refund window amount or even at a price greater than what the consumer originally paid if demand justifies such a release option offer to the consumer. In this example the consumer is offered $500 back for tickets originally purchased at $325, and provides alternative destinations for the consumer to consider. This may be based on the user's profile or information already known about the consumer or user. The consumer, as illustrated, elects a flight to LA for $250 per ticket and has $1,000 in additional spending money based upon refund/savings. The airline gains $1,400 in incremental revenue.

Figure 10:
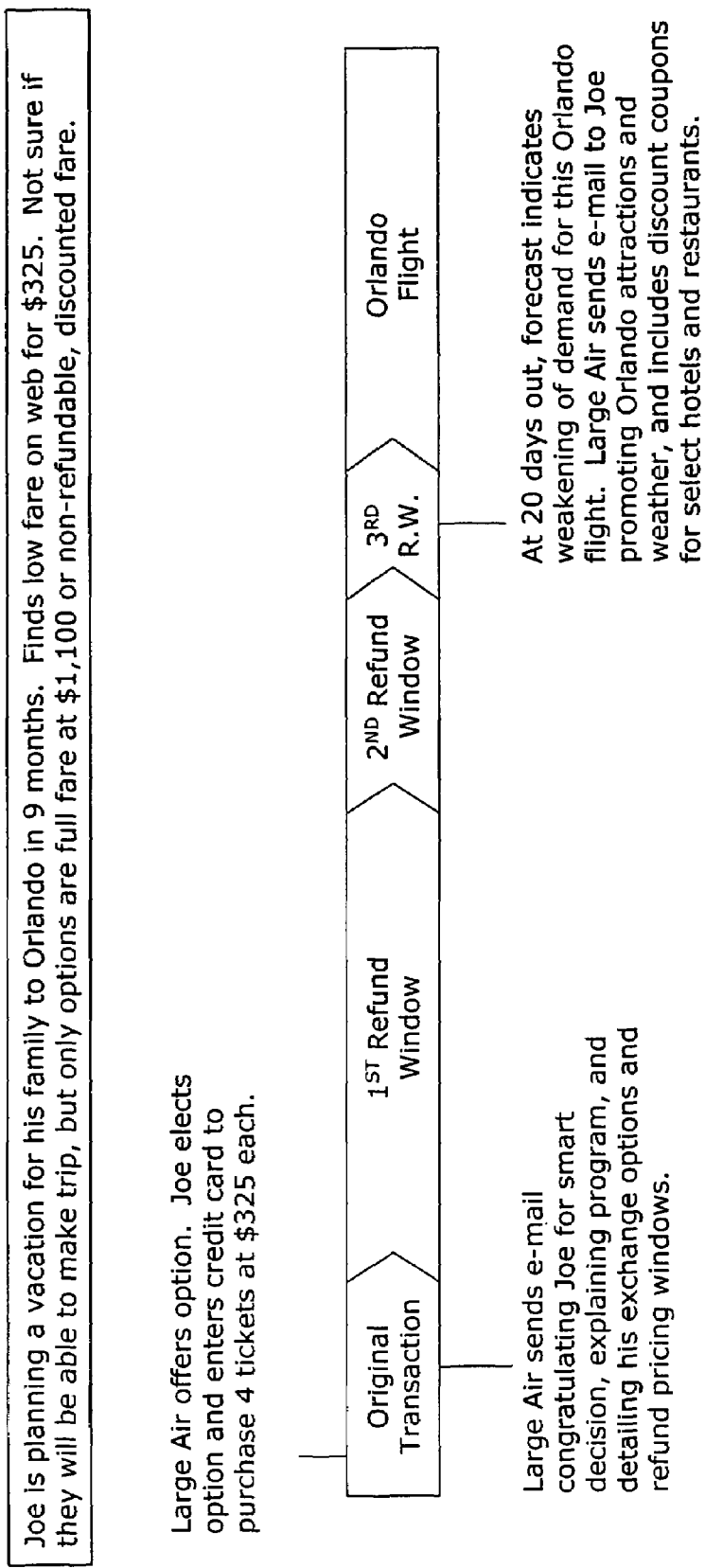
FIG. 10 is an illustrated timeline demonstrating an airline ticket seller offering a customer a hold incentive during a refund window of a minimum refund schedule, and the customer retaining title to the airline ticket seller.

FIG. 10 is an illustrated timeline demonstrating an airline ticket seller offering a customer a hold incentive during a refund window of a minimum refund schedule, and the customer retaining title to the airline ticket. The hold incentive comes about when the airline (or airline ticket provider) determines that demand has lessened to the point where a hold incentive should be offered to those customers that still may elect a refund. This is shown occurring in FIG. 10 at the third refund window. The hold incentive may be virtually anything, and may include promotions that are cost-neutral, such as coupons or discounted attractions for use at the destination in this airline example. The hold incentive benefits the airline by reducing its risk of having more seats going unsold.

Figure 11:
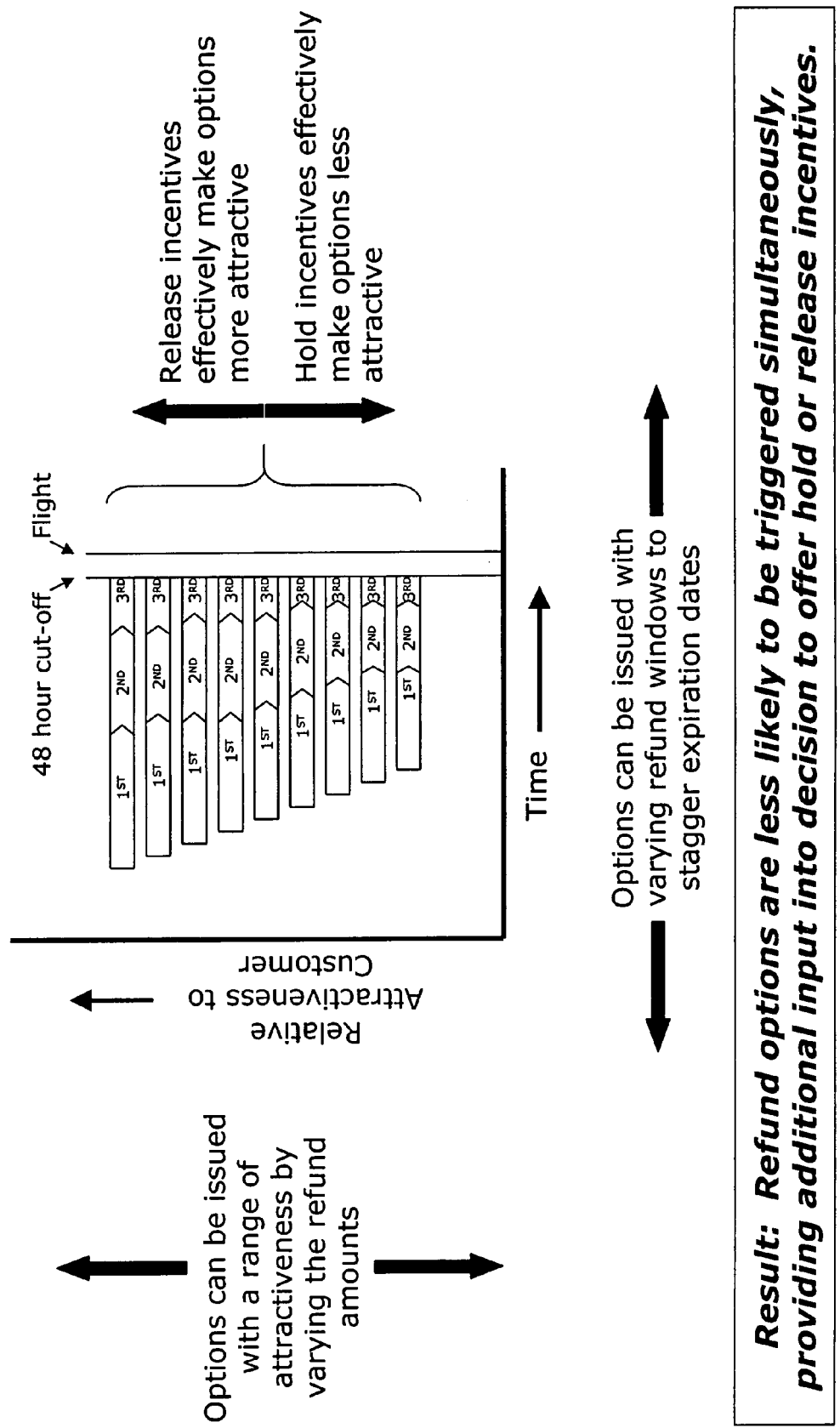
FIG. 11 is an illustrated graph demonstrating the flexibility and variability in which various refund windows of a minimum refund schedule may be offered depending on various factors such as demand, time from expiration, such as time from an airline flight.

FIG. 11 is an illustrated graph demonstrating the flexibility and variability in which various refund windows of a minimum refund schedule may be offered depending on various factors such as demand, time from expiration, such as time from an airline flight. This flexibility allows the seller to tailor and customize minimum refund schedules, including refund amounts, durations, and time before the expiration date, such as the time for a flight, which is illustrated in this embodiment to be 48 hours but could be virtually any time. Release incentives and hold incentives may be used to fine-tune yield management. Staggered or varied refund schedules reduce the likelihood of having multiple refund requests simultaneously or during a short period of time.

FIG. 12 is an illustrated diagram demonstrating how the present invention may provide additional yield management capabilities as compared to sales of a plurality of perishable products without the powerful yield management tools and features of the present invention. The "SOLD FLEXPASS Seats" use an implementation of the present invention and provide additional flexibility to optimize or maximize yield management.

FIG. 13 is an illustrated tabular display or "visualizer" illustrating summary results of a yield management simulator based upon a model of an implementation of one embodiment of the present invention to demonstrate a potential financial impact over numerous airline flights for an implementing airline or airline ticket seller. The model may compare results with and without the implementation of a method of the present invention. Such a model or simulator preferably takes into account numerous variables and may utilize projected capacity factors with random variations from flight to flight, cost characteristics, and financial assumptions to simulate the expected financial results of implementing various aspects and features of the present invention.

At 1302, various data showing results without the present invention are illustrated. These results may be compared with the results shown at 1304. As is illustrated, the model/simulator quantifies the performance of an implementation of the present invention, which are substantial. The data at 1306 and 1310 illustrate additional details of the results of the simulation of an implementation of the present invention, while the data at 1308 are input variables showing the number of flights or iterations that have been modeled in this particular simulation.

Figure 14:
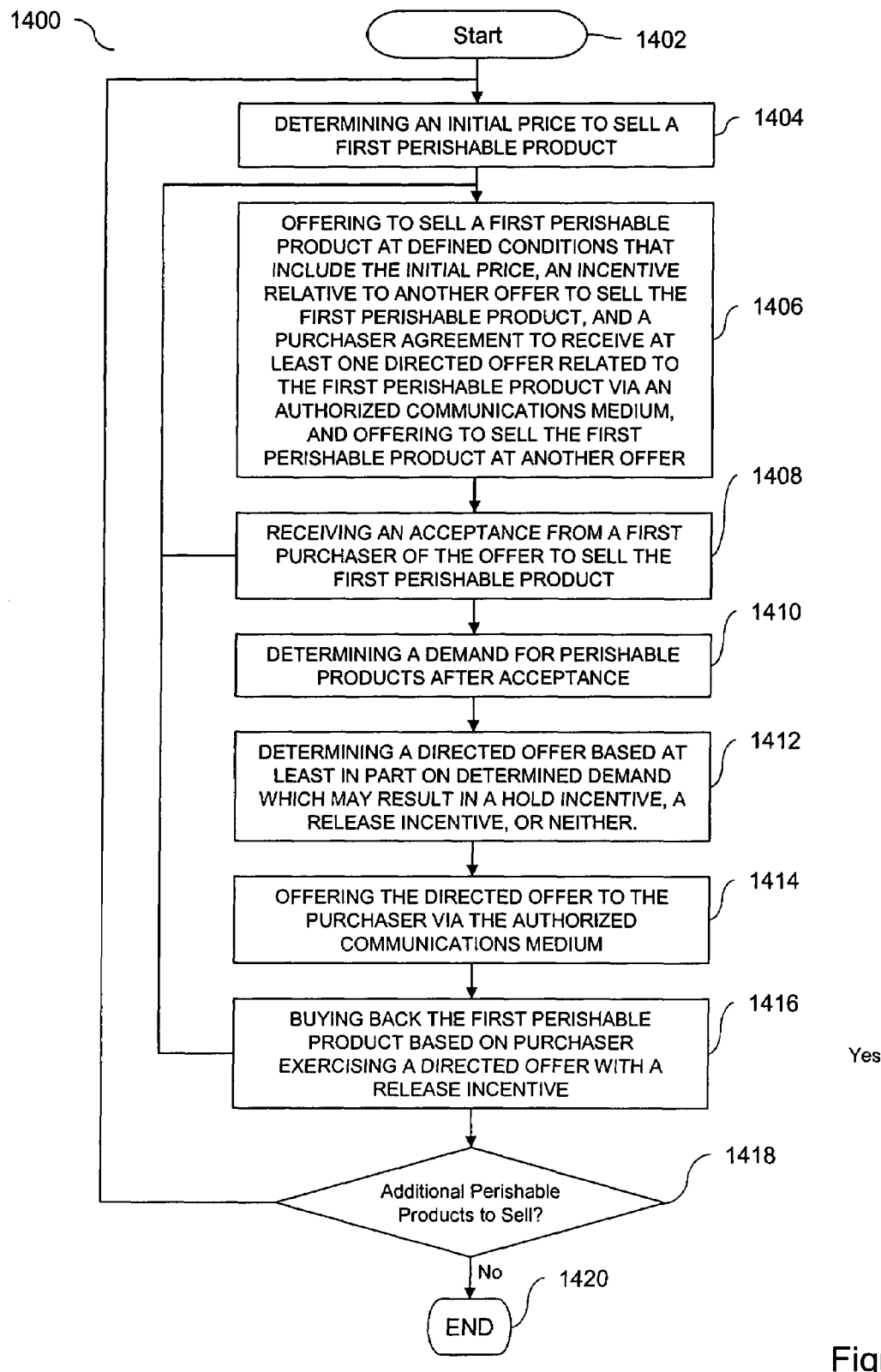
FIG. 14 is a flowchart of a method for a seller to sell a plurality of limited perishable products, according to an aspect of the present invention, that does not include a refund schedule, but includes a directed offer via an authorized communications medium.

FIG. 14 is a flowchart of a method 1400 for a seller to sell a plurality of limited perishable products, according to an aspect of the present invention, that does not include a refund schedule, but includes a directed offer via an authorized communications medium. The description of the method in connection with FIG. 4 is similar to FIG. 14 except that this implementation does not include a minimum refund schedule.

The method 1400 begins at start block 1402 and proceeds to block 1404 where an initial price is determined in which to sell a first perishable product. The method 1400 may proceed next to block 1406 where the first perishable product may be offered for sale at first defined conditions that include at least the initial price, discussed above in connection with block 1404, an incentive relative another offer to sell the first perishable product (such as option 310 in FIG. 5), and a purchaser agreement to receive at least one directed offer related to the first perishable product via an authorized communications medium, which is preferably via an electronic communications medium. The directed offer may include a hold incentive option, a release incentive option, or neither.

Proceeding next to block 1408, a consumer, buyer or user, such as the first purchaser, accepts the offer to sell the first perishable product, as described above in connection with block 1406, and the acceptance is received by the seller. Proceeding next to block 1410, a demand for one of the plurality of limited perishable products may be determined. Depending on the implementation, this may be done for one of the perishable products or for a desired number of the plurality of perishable products. As a consequence of determining the demand, which may be determined using any available or known method, the directed offer may be generated as discussed below in connection with block 1412.

At block 1412, a directed offer is determined. This directed offer may be based at least in part on the determined demand, as discussed above in connection with block 1410, which may result in a hold incentive being generated or a release incentive being generated and then offered to the first purchaser. In other embodiments, the determined demand is such that neither a hold incentive nor a release incentive is generated. For example, if the first perishable product is an airline ticket, which may be one airline ticket from a plurality of airline tickets on the same flight, the first perishable product may have been purchased many months before the flight departure date. As the date approaches, the demand for the flight may unexpectedly increase for a variety of reasons. In such a case, the seller, such as an airline or ticket broker or ticket reseller, may desire to have the ticket back so that it may be resold at a higher price. The purchaser, of course, has no obligation to resell the ticket to the seller, but the seller may entice the purchaser to return the ticket through what may be termed a release incentive. For example, the refund amount may be increased to a level that motivates the first purchaser to return the ticket. Other incentives, such as discounts on other flights or similarly themed destinations and/or attractions, such as those determined based upon user's profile, may also be included in the release incentive.

In another example, the demand for the ticket or tickets may have substantially decreased, as determined at block 1410, and, as such, the seller may decide to enhance or encourage the purchaser not to exchange the perishable product, i.e., the airline ticket for another ticket. In one implementation, method 1400 may include a profile of the first purchaser which includes various interests, likes and dislikes of the first purchaser. Based upon such a profile, the hold incentive may include coupons, passes, event tickets, vouchers, exchange options and the like, to encourage the first purchaser to retain the airline tickets. As can be seen, the directed offer provides a powerful demand management or yield management tool to maximize overall revenue while providing enhanced options to consumers.

In one embodiment or implementation, the release incentive and/or the hold incentive is selected based upon the seller's profile. In a preferred implementation, this is stored and is electronically available to the system of the present invention to assist with determining the purchaser's likes and dislikes in order to properly motivate the purchaser.

Proceeding next to block 1414, the directed offer is offered to the purchaser via the authorized communications medium. At block 1416, in the case of a release incentive, the purchaser may exercise, elect or accept the release incentive and the seller shall buy back the first perishable product according to the terms of the release incentive. In such case, the method 1400 proceeds back to block 1406 where the first perishable product is preferably sold at a higher price. In other embodiments, at block 1416 the method 1400 proceeds back to start block 1402 so that the method 1400 may proceed again from that point.

Proceeding next to decision block 1418, one or more additional perishable products from the plurality of limited perishable products may be processed and sold according to method 1400.

Thus, it is apparent that there has been provided, in accordance with the present invention, a system and method for selling perishable products that satisfy one or more of the advantages set forth above. Although the preferred embodiment has been described in detail, it should be understood that various changes, substitutions, and alterations can be made herein without departing from the scope of the present invention, even if all of the advantages and benefits identified above are not present. For example, the various embodiments and examples shown in the drawings and descriptions provided herein illustrate that the present invention may be implemented and embodied in numerous different ways that still fall within the scope of the present invention, whether expressly shown herein or not. For example, the various elements or components may be combined or integrated in another system or certain features may not be implemented. Also, the techniques, systems, sub-systems, and methods described and illustrated in the preferred embodiment as discrete or separate may be combined or integrated with other systems, designs, techniques, or methods without departing from the scope of the present invention.

As another example, the process could be applied in a concert ticket application as an added feature to an existing customer web interface without the reminder e-mails. Other embodiments or implementation of this invention could apply to tickets to sporting events, hotel reservations, financial instruments, or other perishable products where changes in demand and other factors over time impact the market value of the product. Other embodiments of the invention could utilize various combinations of exchange, refund, special offers, and other similar options, and various combinations of these features could be useful in other implementations. Still other implementations could utilize a combination of telephone customer service agents, automated voice response systems, computer generated faxes, mail, e-mail, Internet access, or other communications methods.

The steps or actions of the methods and processes listed as separate steps or actions may be combined as one, and individual processes may be separated into one or more processes. Some implementations of the method may include a minimum refund schedule, while others may not. The system may include both wired and wireless network technology, and may be implemented in a distributed network system or using a central server operable to perform the majority of the computer processing necessary to carry out a particular implementation of the system and method. Other examples of changes, substitutions, and alterations are readily ascertainable by one skilled in the art and could be made without departing from the spirit and scope of the present invention.

What is claimed:

1. A method for a seller to sell a plurality of limited perishable products, each one of the plurality of limited perishable products of the same type and each one having an expiration date, the method comprising:

determining an initial price at a first time to sell a first perishable product of the plurality of limited perishable products;

determining a minimum refund schedule for the first perishable product that includes at least a first refund opportunity with a first minimum refund amount that may be elected by a purchaser during a first refund time period for the first perishable product;

offering, via a computer, to sell the first perishable product at first defined conditions that include at least the initial price and the minimum refund schedule for the first perishable product;

receiving an acceptance from a first purchaser of the offer to sell the first perishable product at the first defined conditions;

making the first perishable product again available for sale if the first refund opportunity with the first minimum refund amount is elected during the first refund time period for the first perishable product;

determining a demand for at least one of the plurality of limited perishable products at a time after the acceptance of the offer to sell the first perishable product at the first defined conditions;

determining, via the computer, a directed offer related to the first perishable product that is based at least in part upon the determined demand for one of the plurality of limited perishable products at the time after the acceptance of the offer to sell the first perishable product, wherein the directed offer includes at least one of the following from a group that consists of a hold incentive option and a release incentive option;

offering the directed offer related to the first perishable product to the first purchaser, and the directed offer may be accepted by the first purchaser;

buying back the first perishable product from the first purchaser if the directed offer related to the first perishable product is accepted and the directed offer related to the first perishable product includes the release incentive option;

determining an initial price at a second time to sell a second perishable product of the plurality of limited perishable products;

determining a minimum refund schedule for the second perishable product that includes at least a first refund opportunity with a first minimum refund amount that may be elected by a purchaser during a first refund time period for the second perishable product;

offering, via the computer, to sell the second perishable product at second defined conditions that include at least the initial price and the minimum refund schedule for the second perishable product;

receiving an acceptance from a second purchaser of the offer to sell the second perishable product at the second defined conditions;

making the second perishable product once again available for sale if the first refund opportunity with the first minimum refund amount for the second perishable product is elected during the first refund time period for the second perishable product;

determining a demand for at least one of the plurality of limited perishable products at a time after the acceptance of the offer to sell the second perishable product at the second defined conditions;

determining a directed offer related to the second perishable product that is based at least in part upon the determined demand for one of the plurality of limited perishable products at the time after the acceptance of the offer to sell the second perishable product, wherein the directed offer related to the second perishable product includes at least one of the following from a group that consists of a hold incentive option and a release incentive option;

offering the directed offer related to the second perishable product to the second purchaser; and buying back the second perishable product from the second purchaser if the directed offer related to the second perishable product is accepted and the directed offer related to the second perishable product includes the release incentive option.

2. The method of claim 1, wherein the first perishable product includes one from the group that consists of an airline ticket, a concert ticket, a sporting event ticket, a ticket to a live event, a train ticket, a theatre ticket, a ticket to a movie, a hotel room reservation, an option to buy real estate that expires at a future time, an option to invest in a time-share real estate that expires at a future time, an option to buy an investment security that expires at a future time, an option to buy personal property that expires at a future time, an item that is to be auctioned at a future time, a scheduled medical procedure, a scheduled use of medical diagnostic equipment, a car rental reservation, a rental reservation for an object, and an appointment to see a professional.

3. The method of claim 1, wherein the plurality of limited perishable products of the same type includes one from the group that consists of a plurality of airline tickets on the same flight, a plurality of airline tickets of the same class on the same flight, a plurality of coach class airline tickets on the same flight, a plurality of airline tickets on a plurality of flights to a same destination on a plurality of dates, a plurality of airline tickets on a plurality of flights to a same destination on the same day, a plurality of concert tickets for the same show on the same date, a plurality of concert tickets to a performance on a plurality of dates, a plurality of event tickets on the same date, and a plurality of event tickets to a performance on a plurality of dates.

4. The method of claim 1, wherein determining the directed offer and offering the directed offer related to the first perishable product includes determining the hold incentive option that includes:
   determining that the demand has decreased by a certain amount for one of the plurality of limited perishable products at a time after the acceptance of the offer to sell the first perishable product and before the end of a final refund time period for the first perishable product;
   offering the first purchaser the hold incentive option to encourage the first purchaser not to accept the refund opportunity with a minimum refund amount.

5. The method of claim 4, wherein the hold incentive option includes at least one from the group that consists of an airline mileage credit in an airline promotional program, a discount on a product that is complementary to the first perishable product, a free product, a discount on a product, a discount on a service that is complementary to the first perishable product, a free service, a discount on a service, a voucher, and a gift card.

6. The method of claim 1, wherein the release incentive option includes at least one from the group that consists of a full refund, a refund in an amount greater than the minimum refund schedule amount, a refund in an amount greater than the initial price, a voucher, an airline mileage credit in an airline promotional program, an exchange for another product or service of equal value to the initial price, an exchange for another product or service, a gift card, a free product or service, and a item of value to the purchaser.

7. The method of claim 1, wherein the first minimum refund amount includes one from the group that consists of a refund in an amount greater than the initial price, a refund in an amount less than the initial price, a cash payment, a voucher, a gift card, an airline mileage credit in an airline promotional program, an exchange for another product or service of equal value to the initial price, an exchange for another product or service of greater value to the initial price, and an exchange for another product or service of lesser value to the initial price.

8. The method of claim 1, wherein the minimum refund schedule for the first perishable product includes the first refund opportunity that includes the first refund time period with multiple time periods defined therein, and wherein the first minimum refund amount includes multiple minimum refund amounts defined therein and corresponding to the multiple time periods of the first refund time period.

9. The method of claim 1, wherein the first time is the same as the second time.

10. The method of claim 1, wherein determining the demand for one of the plurality of limited perishable products at a time after the acceptance of the offer to sell the first perishable product at the first defined conditions includes offering an option to sell one of the perishable products to a third party at a price higher, lower or equal to the initial price, and receiving an acceptance of the offer of the option to sell one of the perishable products.

11. The method of claim 1, wherein the first defined conditions and the second defined conditions are different.

12. The method of claim 1, wherein the directed offer is determined at least in part based upon a profile of the first purchaser, and wherein the profile includes information about the first purchaser.

13. The method of claim 1, wherein the first perishable product is made available for sale again, and is sold to a third purchaser at a price that is greater than the first minimum refund amount to the first purchaser.

14. The method of claim 1, wherein the first minimum refund amount is equal to the initial price of the perishable product.

15. The method of claim 1, wherein the minimum refund schedule for the first perishable product further includes an offer to receive a discount on another perishable product.

16. The method of claim 15, wherein the other perishable product is complimentary to the first perishable product.

17. The method of claim 1, wherein the minimum refund schedule for the first perishable product further includes an offer to exchange the perishable product for a different perishable product.

18. The method of claim 1, wherein the minimum refund schedule for the first perishable product includes a credit towards purchasing other perishable products in the future.

19. The method of claim 1, wherein the first refund opportunity includes the minimum refund schedule for the first perishable product and the possibility for the first minimum refund amount to be more valuable than the initial price based on chance.

20. The method of claim 19, wherein the first refund amount may include a product.

21. The method of claim 19, wherein the chance is determined from a random drawing.

22. The method of claim 19, wherein the chance is determined from a lottery game.

23. The method of claim 1, wherein receiving a payment for the initial price of the first perishable product serves as the acceptance of the offer to sell the first perishable product.

24. The method of claim 1, wherein the offer to sell the perishable product to the purchaser at defined conditions further includes the condition that the purchaser cannot transfer ownership of the perishable product to a third party.

25. The method of claim 1, wherein determining the demand for one of the plurality of limited perishable products includes considerations of at least one of the following from the group that consists of:
   historical demand,
   current demand,
   current inquiries,
   pricing requests, and
   current perishable product inventory levels.

26. The method of claim 1, wherein the offerings and the acceptances are done electronically.

27. The method of claim 26, wherein receiving a payment is done electronically.

28. The method of claim 1, wherein determining the demand for the first perishable product is done using a processor to execute instructions stored in a memory.

29. The method of claim 28, wherein determining the first minimum refund amount and the second minimum refund amount is done using a processor to execute instructions stored in a memory.

30. The method of claim 1, further comprising:
   displaying information about the minimum refund schedule for the first perishable product through a web portal, wherein the information includes at least the first minimum refund amount.

31. The method of claim 30, wherein the information about the minimum refund schedule for the first perishable product further includes at least one offer to exchange the first perishable product with one or more other products at no additional cost.

32. The method of claim 30, wherein the information about the minimum refund schedule for the first perishable product further includes at least one offer to exchange the first perishable product with one or more other products at an additional cost.

33. The method of claim 1, further comprising:
displaying information about the directed offer through a web portal.

34. The method of claim 1, further comprising:
displaying information about the directed offer through a wireless device.

35. The method of claim 1, wherein the method is implemented using a computer network.

36. The method of claim 1, wherein the method is implemented using a wireless network.

37. The method of claim 1, wherein the method is a computer-implemented method.

38. The method of claim 1, further comprising:
offering to sell the first perishable product at a second initial price without the first defined conditions.

39. The method of claim 38, wherein the initial price for the first perishable product may be the same or different than the second initial price for the first perishable product without the first defined conditions.

40. A computer system for selling perishable products, the system comprising:
a processor and an information storage media operable to execute instructions for a seller to sell a plurality of limited perishable products, each one of the plurality of limited perishable products of the same type and each one having an expiration date, the processor and the information storage media operable to execute instructions that include:
determining an initial price at a first time to sell a first perishable product of the plurality of limited perishable products;
determining a minimum refund schedule for the first perishable product that includes at least a first refund opportunity with a first minimum refund amount that may be elected by a purchaser during a first refund time period for the first perishable product;
offering to sell the first perishable product at first defined conditions that include at least the initial price and the minimum refund schedule for the first perishable product;
receiving an acceptance from a first purchaser of the offer to sell the first perishable product at the first defined conditions;
making the first perishable product again available for sale if the first refund opportunity with the first minimum refund amount is elected during the first refund time period for the first perishable product;
determining a demand for at least one of the plurality of limited perishable products at a time after the acceptance of the offer to sell the first perishable product at the first defined conditions;
determining a directed offer related to the first perishable product that is based at least in part upon the determined demand for one of the plurality of limited perishable products at the time after the acceptance of the offer to sell the first perishable product, wherein the directed offer includes at least one of the following from a group that consists of a hold incentive option and a release incentive option;
offering the directed offer related to the first perishable product to the first purchaser, and the directed offer may be accepted by the first purchaser;
buying back the first perishable product from the first purchaser if the directed offer related to the first perishable product includes the release incentive option that is accepted;
determining an initial price at a second time to sell a second perishable product of the plurality of limited perishable products;
determining a minimum refund schedule for the second perishable product that includes at least a first refund opportunity with a first minimum refund amount that may be elected by a purchaser during a first refund time period for the second perishable product;
offering to sell the second perishable product at second defined conditions that include at least the initial price and the minimum refund schedule for the second perishable product;
receiving an acceptance from a second purchaser of the offer to sell the second perishable product at the second defined conditions;
making the second perishable product once again available for sale if the first refund opportunity with the first minimum refund amount for the second perishable product is elected during the first refund time period for the second perishable product;
determining a demand for at least one of the plurality of limited perishable products at a time after the acceptance of the offer to sell the second perishable product at the second defined conditions;
determining a directed offer related to the second perishable product that is based at least in part upon the determined demand for one of the plurality of limited perishable products at the time after the acceptance of the offer to sell the second perishable product, wherein the directed offer related to the second perishable product includes at least one of the following from a group that consists of a hold incentive option and a release incentive option;
offering the directed offer related to the second perishable product to the second purchaser; and
buying back the second perishable product from the second purchaser if the directed offer related to the second perishable product includes the release incentive option that is accepted.

41. A method for a seller to sell a plurality of limited perishable products, each one of the plurality of limited perishable products of the same type and each one having an expiration date, the method comprising:
determining an initial price at a first time to sell a first perishable product of the plurality of limited perishable products;
offering, via a computer, to sell the first perishable product at first defined conditions that include at least the initial price, an incentive offer to sell the first perishable product relative to another offer to sell the first perishable product, and a purchaser agreement to receive at least one directed offer related to the first perishable product via an authorized communications medium, and also offering to sell the first perishable product at the another offer;
receiving an acceptance from a first purchaser of the offer to sell the first perishable product at the first defined conditions;
determining a demand for at least one of the plurality of limited perishable products at a time after the acceptance of the offer to sell the first perishable product at the first defined conditions;

determining, via the computer, a directed offer related to the first perishable product that is based at least in part upon the determined demand for one of the plurality of limited perishable products at the time after the acceptance of the offer to sell the first perishable product, wherein the directed offer includes at least one of the following from a group that consists of a hold incentive option and a release incentive option;

offering the directed offer related to the first perishable product to the first purchaser via the authorized communications medium, and the directed offer may be accepted by the first purchaser;

buying back the first perishable product from the first purchaser if the directed offer related to the first perishable product includes the release incentive option that is accepted;

determining an initial price at a second time to sell a second perishable product of the plurality of limited perishable products;

offering, via the computer, to sell the second perishable product at second defined conditions that include at least the initial price, an incentive offer to sell the second perishable product relative to another offer for the second perishable product, and a purchaser agreement to receive at least one directed offer related to the second perishable product via an authorized communications medium, and also offering to sell the second perishable product at the another offer;

receiving an acceptance from a second purchaser of the offer to sell the second perishable product at the second defined conditions;

determining a demand for at least one of the plurality of limited perishable products at a time after the acceptance of the offer to sell the second perishable product at the second defined conditions;

determining a directed offer related to the second perishable product that is based at least in part upon the determined demand for one of the plurality of limited perishable products at the time after the acceptance of the offer to sell the second perishable product, wherein the directed offer includes at least one of the following from a group that consists of a hold incentive option and a release incentive option;

offering the directed offer related to the second perishable product to the second purchaser via the authorized communications medium; and buying back the second perishable product from the second purchaser if the directed offer related to the second perishable product includes the release incentive option that is accepted.

42. The method of claim 41, wherein the first time is the same as the second time.

43. The method of claim 41, wherein the incentive offer includes one or more from the group that consists of reduced initial price, a coupon, airline miles, an upgrade, a complementary product, enhanced services, credit towards future purchases, a rebate, and a gift card.

44. The method of claim 41, wherein the authorized communications medium is one from the group consisting of email communications, text messaging, electronic communications, web-based communications, data communications, and telephony based communications.

45. The method of claim 41, wherein the expiration date for the first perishable product and the second perishable product are identical.

46. The method of claim 41, wherein the expiration date for the first perishable product and the second perishable product are similar.

* * * * *